(12) United States Patent
Yomo et al.

(10) Patent No.: US 10,738,171 B2
(45) Date of Patent: Aug. 11, 2020

(54) SIZING-COATED CARBON FIBER BUNDLE, THERMOPLASTIC RESIN COMPOSITION, MOLDED BODY, METHOD FOR MANUFACTURING SIZING-COATED CARBON FIBER BUNDLE, AND METHOD FOR MANUFACTURING MOLDED BODY

(71) Applicant: TORAY INDUSTRIES, INC., Tokyo (JP)

(72) Inventors: Takayuki Yomo, Iyo-gun (JP); Kazuki Yoshihiro, Nagoya (JP); Tomohisa Noguchi, Iyo-gun (JP); Tomoko Ichikawa, Tokyo (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 16/466,562

(22) PCT Filed: Nov. 10, 2017

(86) PCT No.: PCT/JP2017/040548
§ 371 (c)(1),
(2) Date: Jun. 4, 2019

(87) PCT Pub. No.: WO2018/154867
PCT Pub. Date: Aug. 30, 2018

(65) Prior Publication Data
US 2019/0390022 A1 Dec. 26, 2019

(30) Foreign Application Priority Data

Feb. 24, 2017 (JP) .................. 2017-032899
Apr. 3, 2017 (JP) .................. 2017-073453
Aug. 1, 2017 (JP) .................. 2017-148923

(51) Int. Cl.
| | | |
|---|---|---|
| D06M 13/224 | (2006.01) | |
| C08J 5/06 | (2006.01) | |
| C08J 5/04 | (2006.01) | |
| D06M 13/325 | (2006.01) | |
| D06M 13/402 | (2006.01) | |
| D06M 101/40 | (2006.01) | |

(52) U.S. Cl.
CPC .............. C08J 5/06 (2013.01); C08J 5/042 (2013.01); D06M 13/224 (2013.01); D06M 13/325 (2013.01); D06M 13/402 (2013.01); C08J 2323/12 (2013.01); C08J 2379/08 (2013.01); C08J 2381/02 (2013.01); D06M 2101/40 (2013.01); D06M 2200/40 (2013.01)

(58) Field of Classification Search
CPC . D06M 13/224; D06M 13/325; D06M 13/402
See application file for complete search history.

(56) References Cited

U.S. PATENT DOCUMENTS

| 5,106,680 A | 4/1992 | King et al. |
|---|---|---|
| 6,228,281 B1 * | 5/2001 | Sage ............ C03C 25/26 252/8.83 |
| 2014/0066576 A1 | 3/2014 | Anderson et al. |

FOREIGN PATENT DOCUMENTS

| CN | 102212965 A | * | 10/2011 |
|---|---|---|---|
| CN | 104963200 A | * | 10/2015 |
| CN | 105694790 A | * | 6/2016 |
| JP | 4-228677 A | | 8/1992 |
| JP | 2002-528661 A | | 9/2002 |
| JP | 2005264383 A | * | 9/2005 |
| JP | 2006336150 A | * | 12/2006 |
| JP | 2011-214209 A | | 10/2011 |
| JP | 2014-205926 A | | 10/2014 |
| JP | 2016-180053 A | | 10/2016 |

OTHER PUBLICATIONS

International Search Report (PCT/ISA/210) issued in PCT/JP2017/040548, dated Feb. 13, 2018.
Written Opinion (PCT/ISA/237) issued in PCT/JP2017/040548, dated Feb. 13, 2018.

* cited by examiner

*Primary Examiner* — Vickey Nerangis
(74) *Attorney, Agent, or Firm* — Birch, Stewart, Kolasch & Birch, LLP

(57) ABSTRACT

Provided is a sizing-coated carbon fiber bundle that exhibits good spreadability in a step for spreading sizing-coated carbon fibers even in the case in which said carbon fibers exhibit a high adhesiveness with respect to a thermoplastic resin. Provided is a sizing-coated carbon fiber bundle that contains, as sizing components, at least a compound (A) containing an amino group or an amide group.

17 Claims, 1 Drawing Sheet

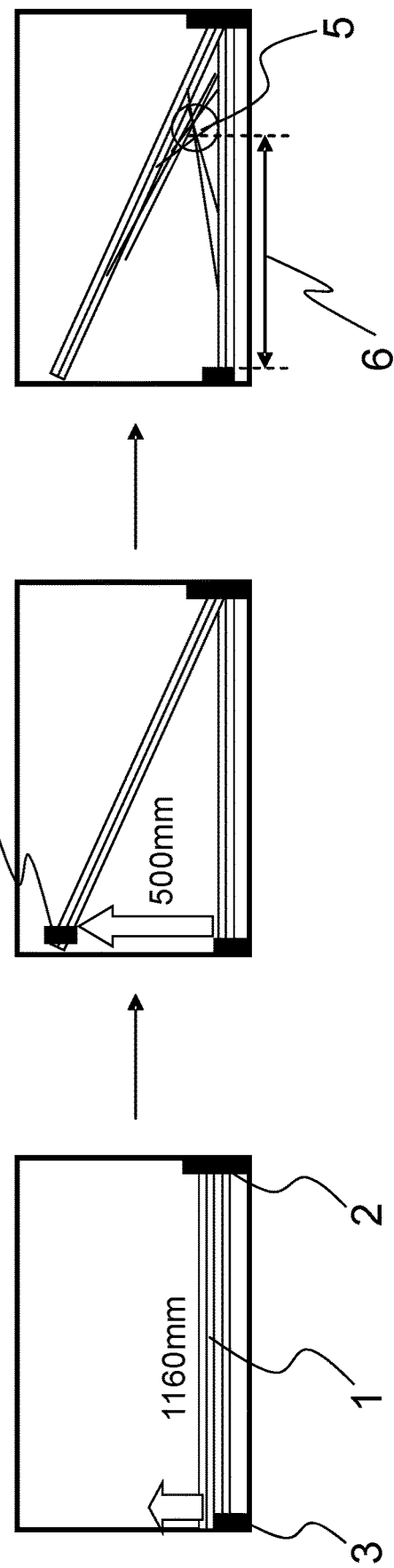

SIZING-COATED CARBON FIBER BUNDLE, THERMOPLASTIC RESIN COMPOSITION, MOLDED BODY, METHOD FOR MANUFACTURING SIZING-COATED CARBON FIBER BUNDLE, AND METHOD FOR MANUFACTURING MOLDED BODY

TECHNICAL FIELD

The present invention relates to a bundle of sizing agent-coated carbon fibers characterized by being coated with a sizing agent that exhibits high adhesiveness to thermoplastic resins and shows high spreadability in a step for spreading the sizing agent-coated carbon fibers, a thermoplastic resin composition containing such a bundle of sizing agent-coated carbon fibers, a molded body, a method for producing such a bundle of sizing agent-coated carbon fibers, and a method for producing such a molded body (referred to as "thermoplastic resin's molded body" or simply "molded body" for the present invention).

BACKGROUND ART

Carbon fibers are light in weight, yet excellent in strength and elastic modulus, and therefore they are generally combined with various matrix resins to provide composite materials to serve in many fields including aircraft members, spacecraft members, automobile members, ship members, civil engineering construction materials, and sports goods. A typical example of composite material formed mainly of carbon fibers is molded products manufactured by press-molding (a molding method including defoaming under pressure and shaping) a preform produced by stacking prepreg layers. Such a prepreg is generally produced by impregnating a carbon fiber substrate formed mainly of continuous carbon fibers aligned in one direction with resin. Composite materials formed mainly of discontinuous carbon fibers (chopped, web, etc.) that are high in shape conformity to complicated shapes and can be molded in a short time have also been proposed, but prepregs can provide better structural materials in terms of mechanical properties such as specific strength and specific rigidity and the stability of such properties.

In the area of carbon fiber composite materials in recent years, there are stronger demands for molding materials that are high in formability, handleability, and suitability for production of molded products with good mechanical properties, and currently higher economic efficiency and productivity are called for in industrial fields. As one of the solutions to these requirements, studies for the development of prepregs based on thermoplastic resin as matrix resin are in progress.

To take advantage of excellent properties of carbon fibers, it is important to achieve improved adhesion between carbon fibers and matrix resin. To achieve improved interfacial adhesion between carbon fiber bundles and a matrix resin, a generally used method is to subject the carbon fiber bundles to oxidation treatment such as gas phase oxidation and liquid phase oxidation in order to introduce an oxygen-containing functional group on the carbon fiber surface. For example, Patent document 1 proposes a method of subjecting carbon fiber bundles to electrolytic treatment in order to improve the interlaminar shear strength, which is an indicator of the interfacial adhesion strength.

If surface modification of carbon fibers alone does not achieve a sufficient degree of interfacial adhesiveness, an attempt is made to perform additional sizing treatment. For example, Patent document 2 proposes a method of applying polyethyleneimine as a sizing agent to carbon fiber bundles in order to achieve improved adhesion to a thermoplastic resin with few functional groups. In addition, Patent document 3 adopts a method of applying polyethylenimine as a sizing agent after carrying out high-order processing of a carbon fiber bundle to form a web etc. In Patent document 4, furthermore, a high molecular weight, high viscosity polyethyleneimine material is used as a binding agent to add to a carbon fiber bundle in order to produce chopped carbon fibers that will not disperse easily in an injection molding machine.

Patent Documents 5 and 6 each propose a method of using an amine compound and a surfactant as lubricants in order to suppress the fluff formation in the process of producing fibers.

As described above, in the field of composite materials formed of continuous or discontinuous carbon fibers, studies have been made to achieve improvement in adhesion and to realize the suppression of fluff formation using lubricants and the improvement in fiber spreadability. On the other hand, in cases where the above techniques are applied to prepreg containing a thermoplastic resin as a matrix resin, there has been no idea of suppressing the occurrence of impregnation unevenness and voids by achieving both high spreadability of sizing agent-coated carbon fiber bundles and high adhesiveness to the matrix resin in order to provide a high viscosity thermoplastic resin with improved impregnability.

PRIOR ART DOCUMENTS

Patent Documents

[Patent document 1] Japanese Unexamined Patent Publication (Kokai) No. HEI-04-361619
[Patent document 2] Japanese Unexamined Patent Publication (Kokai) No. 2013-166924
[Patent document 3] Japanese Unexamined Patent Publication (Kokai) No. 2006-089734
[Patent document 4] Japanese Unexamined Patent Publication (Kokai) No. HEI-03-065311
[Patent document 5] Published Japanese Translation of PCT International Publication JP 2002-528661
[Patent document 6] Japanese Unexamined Patent Publication (Kokai) No. 2006-161018

SUMMARY OF THE INVENTION

Problems to be Solved by the Invention

The present invention, which was made in view of the situation described above, aims to provide a bundle of sizing agent-coated carbon fibers that show high spreadability in a step for spreading the sizing agent-coated carbon fiber bundle even when it exhibits high-level adhesiveness to thermoplastic resins.

Means of Solving the Problems

As a result of studies performed by the inventors, it was found that if a compound having a strong interaction and a high adhesiveness with the matrix resin, such as the compound (A), is used as a sizing agent, the sizing agent-coated carbon fiber bundle tends to suffer a decrease in spreadability, easily leading to uneven impregnation and void formation during prepreg production. As a solution to this problem, they showed that high-level control of the interaction among carbon fibers can be realized to allow high spreadability and high adhesiveness to be maintained simultaneously by accurately controlling the molecular weight and viscosity of the compound (A) and the deposit of the sizing agent.

It was also found that if a lubricant component is added to the sizing agent as a generally used means of improving the spreadability, the spreadability will be improved actually, but the adhesiveness decreases as a result of a decreased ratio of the compound (A), which is a high-adhesion component, indicating that it is difficult for a simple combination of them to serve for simultaneous achievement of high adhesiveness and high spreadability. As a solution to this problem, the inventors showed that if a lubricating agent having a specific chemical structure is added at a controlled ratio to the compound (A), the compound (A) and the compound (B) form an inclined structure on the carbon fibers to serve for simultaneous achievement of high spreadability and high adhesiveness of the sizing agent-coated carbon fiber bundles.

When a sizing agent prepared by mixing a compound (A), which contains an amino group or an amide group, and a compound (B), which has a specific chemical structure and serves as a lubricant component, was used, the compound (A), which is higher in polarity, was seen to be localized more strongly near the carbon fiber rich side whereas the compound (B), which is lower in polarity, is localized more strongly near the outermost layer of the sizing layer, which is located on the opposite side to the carbon fibers. As a result of the inclined structure of this sizing layer, the compound (A) interacts strongly with carbon fibers near the carbon fibers to bring about improved adhesiveness. Furthermore, if the friction coefficient of the outer layers of the single threads in the carbon fiber bundle is decreased, the compound (B), i.e. the lubricant component, will work to enhance the slippage among single threads that come in contact during the fiber spreading step, thus ensuring improved spreadability. As a result, the interfacial adhesion between carbon fibers and the matrix resin will be increased to serve for providing a carbon fiber reinforced composite material having better physical properties.

To solve the above problem and achieve the object, the present invention provides a sizing agent-coated carbon fiber bundle that is formed mainly of carbon fibers coated with a sizing agent containing a compound (A) having an amino group or an amide group, and the sizing agent-coated carbon fiber bundle is characterized by meeting the requirement (i) or (ii) given below:
(i) a sizing agent-coated carbon fiber bundle with a length of 10 cm or more coated with a sizing agent containing a compound (A) having an amino group or an amide group, the compound (A) accounting for 50 parts by mass or more of the total quantity, which accounts for 100 parts by mass, of the sizing agent, the compound (A) having a weight average molecular weight Mw of 2,500 or less, and the compound (A) having a viscosity of 200 to 10,000 mPa·s at 25° C., and the sizing agent having a sizing agent deposit X, which is represented by formula (a) given below, of 0.03 mass % or more and less than 0.1 mass %:

$$X=(W0-W1)/W0\times 100(\%) \quad (a)$$

wherein W0 is the total mass of the carbon fibers and the sizing agent, and W1 is the mass of the carbon fibers alone.
(ii) a sizing agent-coated carbon fiber bundle formed mainly of carbon fibers coated with a sizing agent containing a compound (A) having an amino group or an amide group and a compound (B) as represented by formula (I) and/or (II) given below, altogether accounting for 50 parts by mass or more of the total quantity, which accounts for 100 parts by mass, of the sizing agent, the sizing agent meeting formula (III) wherein WA and WB are the masses of the compounds (A) and (B), respectively, and the difference between the SP value of the compound (A) and that of the compound (B) being 0.5 to 4.0 $(J/cm^3)^{0.5}$:

  formula (I)

  formula (II)

wherein $R_1$, $R_2$, and $R_3$ each represent a hydrocarbon group containing 1 or more carbon atoms, and $$0.1 \leq WB/(WA+WB) < 0.6 \quad \text{formula (III)}.$$

The thermoplastic resin composition according to the present invention is characterized by containing the aforementioned sizing agent-coated carbon fiber bundle and a thermoplastic resin (C).

In addition, the molded body according to the present invention is prepreg or UD (Unidirectional) tape formed from the thermoplastic resin composition.

In addition, the production method for the sizing agent-coated carbon fiber bundle according to the present invention includes a step for coating the carbon fibers with the sizing agent using an aqueous solvent.

In addition, the production method for the molded body according to the present invention includes steps for preparing a thermoplastic resin composition from the sizing agent-coated carbon fiber bundle and the thermoplastic resin (C) and subsequently heating the thermoplastic resin composition at 300° C. or more.

Advantageous Effect of the Invention

The present invention can provide a sizing agent-coated carbon fiber bundle that shows high spreadability during the spreading step of the sizing agent-coated carbon fiber bundle while maintaining high-level adhesiveness to thermoplastic resin. As a result, this allows the thermoplastic resin to form a molded body having a uniform fiber content and this thermoplastic resin's molded body, which contains the sizing agent-coated carbon fiber bundle, will have good mechanical characteristics.

BRIEF DESCRIPTION OF THE DRAWINGS

FIG. 1 This illustrates the method for measuring the average tearable distance.

DESCRIPTION OF PREFERRED EMBODIMENTS

An embodiment of the present invention is described below.

It is essential for the sizing agent that is used for the present invention to contain a compound (A) that contains at least either an amino group or an amide group.

A carbon fiber bundle coated with a sizing agent that contains such a compound (A) having an amino group or an amide group shows high adhesiveness to thermoplastic resins. As a result, the carbon fiber bundle coated with the sizing agent allows the thermoplastic resin to form a molded body having improved mechanical characteristics. The mechanism for this has not been clarified yet, but it is inferred that the amino group and amide group, which are high in polarity, interacts strongly through hydrogen bonds etc. with high-polarity, oxygen-containing structures such as carboxyl group and hydroxyl group existing on the carbon fiber bundle's surface or in the resin, thereby developing high adhesiveness.

Examples of the compound (A) to use for the present invention include aliphatic amine compounds, aromatic amine compounds, aliphatic amide compound, and aromatic amide compounds. In particular, aliphatic amine compounds are preferred from the viewpoint of their high adhesiveness. The high adhesiveness of these aliphatic amine compounds is thought to be attributed to their very high polarity compared to other compounds having amino groups or amide groups.

Specific examples of these aliphatic amine compounds include diethylene triamine, triethylene tetramine dicyan diamide, tetraethylene pentamine, dipropylene diamine, piperidine, N,N-dimethyl piperazine, triethylene diamine, polyamide amine, octyl amine, lauryl amine, myristyl amine, stearyl amine, cocoalkyl amine, beef tallow alkyl amine, oleyl amine, hardened beef tallow alkyl amine, N,N-dimethyllauryl amine, N,N-dimethylmyristyl amine, other aliphatic monoamines, polyethylene imine, polypropylene imine, polybutylene imine, 1,1-dimethyl-2-methyl ethylene imine, 1,1-dimethyl-2-propyl ethylene imine, N-acetyl polyethylene imine, N-propionyl polyethylene imine, N-butyryl polyethylene imine, N-valeryl polyethylene imine, N-hexanoyl polyethylene imine, N-stearoyl polyethylene imine, and other polyalkylene amines, as well as derivatives thereof and mixtures thereof.

Of the aliphatic amine compounds, those containing two or more functional groups in one molecule are preferred because they can develop high adhesiveness easily. In particular, polyalkylene imine is preferred because the number of functional groups contained in one molecule can be increased easily to improve the adhesiveness. Compounds having two or more functional groups in one molecule tend to have high adhesiveness probably because their molecules tend to increase in polarity with an increasing number of functional groups.

Specific examples of the aromatic amine compounds include 1,2-phenylene diamine, 1,3-phenylene diamine, 1,4-phenylene diamine, benzidine, triaminophenol, triglycidyl aminocresol, 2,4,6-triaminophenol, 1,2,3-triaminopropane, 1,2,3-triaminobenzene, 1,2,4-triaminobenzene, and 1,3,5-triaminobenzene, as well as derivatives thereof and mixtures thereof.

Specific examples of the aliphatic amide compounds include monoamides such as lauric acid amide, palmitic acid amide, stearic acid amide, behenic acid amide, oleic acid amide, erucic acid amide, ricinoleic acid amide, N-stearyl stearic acid amide, N-oleyl oleic amide, N-stearyl oleic acid amide, N-oleyl stearic acid amide, N-stearyl erucic acid amide, N-oleyl palmitic acid amide, methylol stearic acid amide, and methylol behenic acid amide; bisamides such as methylene-bis-stearic acid amide, ethylene biscapric acid amide, ethylene bislauric acid amide, ethylene bisstearic acid amide, ethylene bisisostearic acid amide, ethylene bishydroxystearic acid amide, ethylene bisbehenic acid amide, hexamethylene-bis-stearic acid amide, hexamethylene bisbehenic acid amide, hexamethylene bishydroxystearic acid amide, N,N'-distearyl adipic acid amide, N,N'-distearyl sebacic acid amide, ethylene bisoleic acid amide, hexamethylene bisoleic acid amide, and N,N'-dioleyl adipic acid amide; aliphatic polyamides such as nylon 6, nylon 66, nylon 11, nylon 12, nylon 46, and nylon 610; and derivatives thereof and mixtures thereof. It may be useful to use a polyamide based resin having a polyalkylene oxide chain, a hydrophilic group such as tertiary amine component, etc., introduced in its molecule in order to make it aqueous easily. These aliphatic amides may be used singly or as a mixture of two or more thereof.

Specific examples of the aromatic amide compounds include aromatic amidoamines such as aminobenzamide, aminobenzanilide, and aminobenzene sulfone amide; aromatic/aliphatic polyamides such as polyhexamethylene terephthalamide (nylon 6T) and nylon 616T copolymer; and derivatives thereof. These aromatic amides may be used singly or as a mixture of two or more thereof.

For the sizing agent used to form a sizing agent-coated carbon fiber bundle that meets the requirement (i) for the present invention, it is essential for the compound (A) contained therein to account for 50 parts by mass or more relative to the total quantity, which accounts for 100 parts by mass, of the sizing agent excluding the solvent. A content of 50 parts by mass or more ensures improvement in adhesiveness and allows the thermoplastic resin to form a molded body having improved physical properties. The content is preferably 60 parts by mass or more and more preferably 80 parts by mass or more. In addition to the compound (A), other components such as nonionic surface active agent may be add appropriately unless it has significant influence on the effect of the invention.

For a sizing agent-coated carbon fiber bundle that meets the requirement (i) for the present invention, it is essential for the compound (A) to have a weight average molecular weight Mw of 2,500 or less. Here, the aforementioned weight average molecular weight Mw is measured by gel permeation chromatography (hereinafter abbreviated as GPC) using pullulan as reference material. The sizing agent increases in viscosity with an increasing Mw, and a larger force is required to separate carbon fibers, which are bonded by the sizing agent, from each other. If the value of Mw is 2,500 or less, the viscosity, which represents the movability of the sizing agent, decreases and the force binding the carbon fibers weakens, allowing the carbon fiber bundle to have improved spreadability. The value of Mw is preferably 1,500 or less and more preferably 1,000 or less. From the viewpoint of decomposition, on the other hand, a larger value of Mw serves to depress the volatilization and decomposition of the sizing agent at high temperatures. With respect to the lower limit, the Mw value is preferably 500 or more and more preferably 650 or more.

For a sizing agent-coated carbon fiber bundle that meets the requirement (i) for the present invention, it is essential for the compound (A) to have a viscosity of 200 to 10,000 mPa·s at 25° C. If the viscosity is 10,000 mPa·s or less, the force exerted by the sizing agent to bind the carbon fibers weakens, leading to improved spreadability. The viscosity is preferably 8,000 mPa·s or less and more preferably 3,000 mPa·s or less. There are no particular lower limit to the viscosity, but if it is 200 mPa·s or more, it serves to ensure stable control of the deposit of the sizing agent on the carbon fiber bundle during the coating step. Here, for the present invention, the viscosity of a sizing agent at a temperature of 25° C. is measured by using a viscoelasticity measuring device at a frequency of 3.14 rad/s.

For the sizing agent-coated carbon fiber bundle that meets the requirement (i) for the present invention, it is essential for the sizing agent applied thereon to account for 0.03 mass % or more and less than 0.1 mass % relative to the carbon fiber bundle. If the deposit of the sizing agent is 0.03 mass % or more, the sizing agent applied uniformly over the surface serves to improve the abrasion resistance of the carbon fiber bundle and depress fuzzing during production and processing steps, leading to a carbon fiber sheet having high spreadability and improved quality in smoothness etc. The deposit is preferably 0.04 mass % or more and more preferably 0.05 mass % or more. On the other hand, a sizing agent deposit of less than 0.1 mass % serves to decrease the quantity of the sizing agent existing among carbon fibers and weaken the force that binds the fibers, allowing the fibers to be opened easily under an external force to permit uniform spreading of the fiber bundle. The deposit is preferably less than 0.09 mass % and more preferably less than 0.08 mass %.

For a sizing agent-coated carbon fiber bundle that meets the requirement (i) for the present invention, it is essential for each single thread to have a length of 10 cm or more. A carbon fiber thread with a length of 10 cm or more can be regarded as substantially continuous and serves to ensure effective improvement in spreadability, which is a major feature of the present invention. It is preferably 30 cm or more long and more preferably 100 cm or more long.

For the sizing agent to use to form a sizing agent-coated carbon fiber bundle that meets the requirement (ii) for the present invention, it is essential to contain a compound (B) as represented by formulae (I) and/or (II) given below:

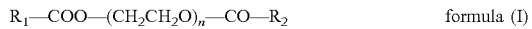

formula (I)

formula (II)

wherein $R_1$, $R_2$, and $R_3$ each represent a hydrocarbon group containing 1 or more carbon atoms.

In a carbon fiber bundle that is coated with a sizing agent containing a compound (B), it forms an inclined structure with the compound (A) to reduce the friction among single yarns while maintaining adhesiveness, leading to high smoothness among single yarns during the spreading step. As a result, the spreadability is improved. A carbon fiber bundle coated with such a sizing agent can easily undergo fiber spreading under an external force, thereby serving for uniform spreading of the fiber bundle.

A sizing agent to use for the present invention preferably contains a compound as represented by formula (I) and/or formula (II). A compound as represented by formula (I) has hydrocarbon groups at both molecular ends and accordingly, it is highly hydrophobic and tends to exist densely on the outer face of the sizing agent layer of the sizing agent-coated carbon fiber bundle. This is desirable because the spreadability will improve accordingly. A compound as represented by formula (II) has a hydrophilic group at a molecular end and accordingly, it tends to be compatible with the compound (A), which is a polar component, thus serving to form a uniform inclined structure free of phase separation in the sizing agent layer. This is desirable because the spreadability will improve accordingly.

It is essential for the compound (B) to have a hydrocarbon group containing one or more carbon atoms at each of the positions $R_1$ and $R_2$ in formula (I) and $R_3$ in formula (II). A highly hydrophobic hydrocarbon group tends to be located densely on the outer sizing agent layer on the carbon fibers, thus working to decrease the friction coefficient of the surface. It preferably contains 10 or more, more preferably 15 or more, carbon atoms. On the other hand, it preferably contains 22 or less carbon atoms. The number is preferably 22 or less because the compound (B) will be high in solubility in water.

For the sizing agent used to form a sizing agent-coated carbon fiber bundle that meets the requirement (ii) for the present invention, it is essential for the compound (A) and the compound (B) contained therein to account altogether for 50 parts by mass or more relative to the total quantity, which accounts for 100 parts by mass, of the sizing agent excluding the solvent. A total content of 50 parts by mass or more develops the effect of allowing the compound (A) to serve for improving the adhesiveness and allowing the compound (B) to serve for improving the spreadability. It can also serve to produce a thermoplastic resin composition having improved physical properties. The total content of the compound (A) and the compound (B) is preferably 60 parts by mass or more and more preferably 80 parts by mass or more.

For the sizing agent used to form a sizing agent-coated carbon fiber bundle that meets the requirement (ii) for the present invention, furthermore, it is essential to meet formula (III) wherein WA and WB are the masses of the compounds (A) and (B), respectively. If the value is 0.1 or more, it is preferable because the compound (B) will account for a large proportion to ensure a reduction in the interfiber friction and an increase in the spreadability. It is more preferably 0.2 or more. If the value is less than 0.6, it is preferable because the compound (A) will account for a large proportion to ensure an increase in the adhesiveness. It is more preferably 0.5 or less and still more preferably 0.3 or less.

formula (III)

In order to ensure both adhesiveness and spreadability, it is preferable that the mass WA of the compound (A) and the mass WB of the compound (B) meet formula (III), that the compound (B) used for the present invention accounts for 10 parts by mass or more relative to the total quantity, which accounts for 100 parts by mass, of the sizing agent excluding the solvent, and that the compound (A) accounts for 40 parts by mass or more relative to the total quantity, which accounts for 100 parts by mass, of the sizing agent excluding the solvent. The spreadability can be further improved if the compound (B) used for the present invention accounts for 25 parts by mass or more relative to the total quantity, which accounts for 100 parts by mass, of the sizing agent excluding the solvent, and accordingly, its content is more preferably 25 parts by mass or more.

For the sizing agent used for the present invention, furthermore, it is essential that the difference between the SP value of the compound (A) and that of the compound (B) be 0.5 to 4.0 $(J/cm^3)^{0.5}$. Here, the SP value means the generally known solubility parameter that represents the solubility and polarity.

The SP value as defined for the present invention is calculated from the molecular structure according to the Fedors' method described in Polym. Eng. Sci. 14(2), 147-154 (1974). If the difference in SP value is 0.5 or more, the compound (A) and the compound (B) will differ so largely in polarity that an inclined structure will be formed. It is preferably 1.0 $(J/cm^3)^{0.5}$ or more and more preferably 2.0 $(J/cm^3)^{0.5}$ or more. If it is 4.0 $(J/cm^3)^{0.5}$ or less, it is preferable because the compatibility between the compound (A) and the compound (B) will increase and accordingly, the components of the sizing agent will be prevented from forming domains, thus allowing the compound (A) and the compound (B) to form a uniform inclined structure to ensure improved adhesiveness and spreadability. It is preferably 3.5 $(J/cm^3)^{0.5}$ or less and more preferably 3.0 $(J/cm^3)^{0.5}$ or less.

For the carbon fibers that meet the requirement (i) for the present invention, it is preferable that the average tearable distance of the carbon fibers is 700 mm or more. As the average tearable distance increases, it means that the carbon fibers undergo a smaller degree of entanglement, whereas as the average tearable distance decreases, it means that the carbon fibers undergo a larger degree of entanglement. If the distance is 700 mm or more, the carbon fibers undergo a smaller degree of entanglement and accordingly, the carbon fibers will be less likely to be bonded to each other by the sizing agent, thus allowing the fiber bundle to spread uniformly under an external force during the spreading step. The average tearable distance is more preferably 900 mm or more. Any appropriate method may be adopted as a means of preparing a sizing agent-coated carbon fiber bundle to use for the present invention that has an average tearable distance controlled in the aforementioned range, but this can be achieved if the number of entanglement points involving single threads of the carbon fibers is decreased by decreasing the degree of entangling treatment with a fluid performed after production of the carbon fiber bundle or in any step of the production process of the carbon fiber bundle.

For the compound (B) used to form a sizing agent-coated carbon fiber bundle that meets the requirement (ii) for the present invention, the hydrophile-lipophile balance (HLB) is preferably 10 or more. The HLB value as defined for the present invention is calculated from the molecular structure according to the Griffin's method described in "Shin Kaimen Kasseizai Nyumon (An introduction to Surface Active Agent, New ed.)" p. 128 (1992). Commonly, a sizing agent in the form of a solution is spread over carbon fibers, and water is generally used as solvent from the viewpoint of meeting safety requirements for the service environment. If having a HLB value of 10 or more, the compound (B) will dissolve uniformly in an aqueous solution and accordingly, it can be spread uniformly over the carbon fibers, leading to a reduction in irregular deposit distribution of the sizing agent over the carbon fibers. This is desirable because the spreadability will improve accordingly. It is more preferably 12 or more, still more preferably 14 or more.

For the compound (B) used to form a sizing agent-coated carbon fiber bundle that meets the requirement (ii) for the present invention, the value of n in formulae (1) and (11) is preferably 12 or more.

An n of 12 or more allows the compound (B) to be high in hydrophilicity and accordingly, when a solution of the sizing agent is spread over carbon fibers, it ensures prevention of an irregular deposit distribution of the sizing agent over the carbon fibers. The value of n is more preferably 20 or more and still more preferably 30 or more. If it is 100 or less, furthermore, it is preferable because the molecular weight increases and the insolubilization in water is depressed, leading to a reduction in irregularity of deposit distribution.

For the compound (B) used to form a sizing agent-coated carbon fiber bundle that meets the requirement (ii) for the present invention, the melting point is preferably 20° C. or more. If the melting point is 20° C. or more, it is preferable because, when the compound (B) is used at normal temperature (25° C.), the separated part of the compound (B) coming out of the surface layer will be in a solid state, leading to a reduction in the interfiber friction and an increase in the spreadability. It is more preferably 40° C. or more and still more preferably 45° C. or more. There is no particular upper limit, but the spreadability does not improve anymore at 50° C. or more in some cases.

Specific examples of the compound (B) used to form a sizing agent-coated carbon fiber bundle that meets the requirement (ii) for the present invention include polyethylene glycol fatty acid esters such as PEG monocaprylic acid esters, PEG monoheptylic acid esters, PEG monopelargonic acid esters, PEG monocapric acid esters, PEG monolauric acid esters, PEG monomyristic acid esters, PEG monopentadecylic acid esters, PEG monopalmitic acid esters, PEG monolinoleic acid esters, PEG dilauric acid esters, PEG monooleic acid esters, PEG dioleic acid esters, PEG dicaprylic acid esters, PEG diheptylic acid esters, PEG dipelargonic acid esters, PEG dicapric acid esters, PEG dilauric acid esters, PEG dimyristic acid esters, PEG dipentadecylic acid esters, PEG dipalmitic acid esters, and PEG dilinoleic acid esters. These compounds (B) may be used singly or as a combination of two or more thereof. Here, PEG is an abbreviation of polyethylene glycol.

For the sizing agent used to form a sizing agent-coated carbon fiber bundle that meets the requirement (ii) for the present invention, it is preferable for the compound (A) to have a surface free energy of 45 mJ/m$^2$ or more. If the surface free energy is 45 mJ/m$^2$ or more, it is preferable because the compound (A) can localize easily on the carbon fiber surface to allow the aforementioned inclined structure to be developed in the sizing agent, thus ensuring high adhesiveness. It is more preferably 50 mJ/m$^2$ or more and still more preferably 60 mJ/m$^2$ or more.

The surface free energy means the excessive energy that the molecules at the solid or liquid surface possess as compared with the molecules existing inside the material.

For the present invention, the surface free energy of the sizing agent of the compound (A) means its surface free energy at 25° C. The surface free energy can be determined by a generally known method such as the one described below.

First, the surface free energy of the flat thermoplastic resin plate is determined. A good calculation method is as described below. A liquid having known polar and variance surface free energy components is dropped on a flat plate of thermoplastic resin and the contact angle is determined from the shape of the droplet formed. Then, it is applied to the aforementioned Owens approximation formula to calculate the square of inclination a as the polar surface free energy component ($\gamma^p_s$) of the flat thermoplastic resin plate and the square of intercept b as its polar surface free energy component ($\gamma^d_s$). The surface free energy ($\gamma$) of the flat plate of thermoplastic resin is obtained as the sum of $\gamma^p_s$ and $\gamma^d_s$.

For Owens approximation, the surface free energy $\gamma_L$ of the liquid, polar surface free energy component $\gamma^p_L$, variance surface free energy component $\gamma^d_L$, and contact angle θ determined from measurements are applied to formulae (IV) to (VI) and plotted on a X-Y plane. Two or more liquids having known polar and variance surface free energy components are used for plotting and the least-square method is carried out for collinear approximation. Then, the inclination and intercept of the resulting approximation are used for calculation.

$$Y = a \cdot X + b \tag{IV}$$

$$X = (\gamma^p_L)^{0.5}/(\gamma^d_L)^{0.5} \tag{V}$$

$$Y = (1 + \cos\theta) \cdot (\gamma_L)/2(\gamma^d_L)^{0.5} \tag{VI}$$

The surface free energy of the compound (A) can be determined by dropping the sizing agent on a flat thermoplastic resin plate having a surface free energy as calculated by the aforementioned method, measuring the contact angle from the shape of the droplet formed, and applying the values of $\gamma^p_L$ and $\gamma^d_L$ in formulae (IV) to (VI) given above.

For the sizing agent used to form a sizing agent-coated carbon fiber bundle that meets the requirement (ii) for the present invention, it is preferable that the sizing agent is substantially free of compounds containing epoxy groups. Here, the expression "substantially free of compounds" means that the compounds do not exist at all or that even if they exist in the form of additives for example, they account for 1 part by mass or less of the total quantity of the sizing agent. Highly reactive epoxy groups will react with amino groups at molecular ends of amine compounds or amide compounds to form strong crosslinked structures. Therefore, the sizing agent should be substantially free of compounds containing epoxy groups in order to prevent the formation of a crosslinked structure of single threads of carbon fibers and achieve improved spreadability.

For the sizing agent-coated carbon fiber bundle that meets the requirement (ii) for the present invention, it is preferable for the interfiber friction coefficient to be 0.30 or less. If it is 0.30 or less, the friction among the single threads in the carbon fiber bundle will decrease to ensure improved spreadability. It is more preferably 0.25 or less.

The interfiber friction coefficient can be controlled by changing the roughness of the carbon fiber surface, type and quantity of the lubricant component contained in the sizing agent, and its deposit on the sizing agent-coated carbon fiber bundle.

The coefficient of friction between fibers can be determined by the procedure described below. A carbon fiber bundle is wound around an irrotationally fixed bobbin to a uniform thickness and then the same carbon fiber bundle as the wound one is wound around its surface to form a contact angle of $3\pi$ (rad) in such a manner that they do not overlap on the circumference. A weight is attached to one end of the wound carbon fiber bundle and the other end is pulled at a constant speed, followed by measuring the tension at the point where the wound carbon fiber bundle starts to move.

For the sizing agent-coated carbon fiber bundle that meets the requirement (ii) for the present invention, it is preferable for the deposit of the sizing agent to account for 0.01 part by mass or more and 1.0 part by mass or less relative to the total quantity; which accounts for 100 parts by mass, of the sizing agent-coated carbon fiber bundle. If the deposit of the sizing agent is 0.01 part by mass or more, the sizing agent applied uniformly over the surface serves to improve the abrasion resistance of the carbon fiber bundle and depress fuzzing during production and processing steps, leading to a carbon fiber sheet having high spreadability and improved quality in smoothness etc. The deposit is preferably 0.3 part by mass or more. On the other hand, a sizing agent deposit of less than 1.0 part by mass serves to decrease the quantity of the sizing agent existing among carbon fibers and weaken the force that binds the fibers, allowing the fibers to be opened easily under an external force to permit uniform spreading of the fiber bundle. The deposit is preferably 0.7 part by mass or less and more preferably 0.5 part by mass or less.

There are no specific limitations on the carbon fiber bundle to use for the present invention, but polyacrylonitrile based carbon fibers are preferred from the viewpoint of mechanical characteristics. A polyacrylonitrile based carbon fiber bundle to use for the present invention can be produced by treating fibers of a polyacrylonitrile based polymer that serves as precursor for carbon fibers to make them flame resistant in an oxidizing atmosphere at a maximum temperature of 200° C. to 300° C., subjecting it to preliminary carbonization treatment in an inactive atmosphere at a maximum temperature of 500° C. to 1200° C., and then subjecting it to carbonization treatment in an inactive atmosphere at a maximum temperature of 1,200° C. to 2,000° C.

For the present invention, it is preferable to subject the carbon fiber bundle to oxidization treatment so that oxygen-containing functional groups are introduced into the surface in order to improve the adhesiveness between the carbon fiber bundle and thermoplastic resin. Useful oxidization treatment methods include gas phase oxidization, liquid phase oxidization, and liquid phase electrolytic oxidization, of which liquid phase electrolytic oxidization has been preferred from the viewpoint of high productivity and uniform treatment.

For the present invention, an acidic electrolyte or an alkaline electrolyte may be used as the electrolyte for the liquid phase electrolytic oxidization process. Examples of the acidic electrolyte include, for example, inorganic acids such as sulfuric acid, nitric acid, hydrochloric acid, phosphoric acid, boric acid, and carbonic acid; organic acids such as acetic acid, butyric acid, oxalic acid, acrylic acid, and maleic acid; and salts such as ammonium sulfate and ammonium hydrogen sulfate. Among others, sulfuric acid and nitric acid, which are strong acids, are preferred. Specific examples of the alkaline electrolyte include aqueous solutions of hydroxides such as sodium hydroxide, potassium hydroxide, magnesium hydroxide, calcium hydroxide, and barium hydroxide; aqueous solutions of carbonates such as sodium carbonate, potassium carbonate, magnesium carbonate, calcium carbonate, barium carbonate, and ammonium carbonate; aqueous solutions of hydrogen carbonates such as sodium hydrogen carbonate, potassium hydrogen carbonate, magnesium hydrogen carbonate, calcium hydrogen carbonate, barium hydrogen carbonate, and ammonium hydrogen carbonate; and others such as aqueous solutions of ammonia, tetraalkylammonium hydroxide, and hydrazine.

For the present invention, the quantity of the oxygen-containing functional groups introduced into the carbon fiber bundle is preferably such that the surface oxygen concentration (O/C), which is the ratio between the number of oxygen (O) atoms and that of carbon (C) atoms on the fiber surface as measured by X-ray photoelectron spectroscopy, is in the range of 0.14 to 0.30. If the O/C ratio is 0.14 or more, there exist a large number of carboxyl groups and hydroxyl groups on the carbon fiber surface to realize a strong interaction with the sizing agent and improved adhesiveness. The O/C ratio is preferably 0.16 or more and more preferably 0.18 or more. From the viewpoint of the decrease in the strength of the carbon fibers themselves caused by oxidization, on the other hand, a smaller O/C ratio is more desirable, and the O/C ratio is preferably 0.30 or less. It is preferably 0.25 or less and more preferably 0.20 or less.

The O/C ratio of a carbon fiber bundle can be determined by X-ray photoelectron spectroscopy according to the following procedure. First, dirt or the like attached on the surface of the carbon fiber bundle is removed with a solvent, and the carbon fiber bundle is cut into pieces of 20 mm, which are then scattered on a specimen support table made of copper, followed by maintaining the specimen chamber at $1 \times 10^{-8}$ Torr using $AlK_{\alpha 1,2}$ as X-ray source. For peak correction for electrification that occurs during measurement, the value of bond energy of the $C_{1s}$ primary peak (peak top) is adjusted to 284.6 eV. The $C_{1s}$ peak area can be determined by drawing a straight baseline in the range of 282 to 296 eV. The $O_{1s}$ peak area can be determined by drawing a straight baseline in the range of 528 to 540 eV. Here, the surface oxygen concentration can be calculated from the ratio between the $O_{1s}$ peak area and the $C_{1s}$ peak area as a ratio in the number of atoms using an inherent sensitivity correction value of the equipment.

In the next place, the method for producing the sizing agent-coated carbon fiber bundle of the present invention will be described.

First, the means of applying (imparting) a sizing agent to the carbon fiber bundle used for the present invention will be described.

For the present invention, it is preferable for the sizing agent to be used as a uniform solution prepared by dilution with a solvent. Examples of the solvent include water, methanol, ethanol, 2-propanol, acetone, methyl ethyl ketone, dimethyl formamide, and dimethyl acetamide, of which water is preferred from the viewpoint of advantage due to easy handling and safety.

Examples of the application means include a method in which the carbon fiber bundle is immersed in a sizing agent solution via rollers, a method in which the carbon fiber bundle is brought into contact with rollers carrying a deposited sizing agent solution, and a method in which a sizing agent solution is sprayed to the carbon fiber bundle, of which the method in which the carbon fiber bundle is immersed in a sizing agent solution via rollers is preferred as a means of producing a sizing agent-coated carbon fiber bundle to use for the present invention. Either a batch-wise or continuous procedure may be adopted for the application of a sizing agent, but the use of a continuous type procedure is preferred from the viewpoint of high productivity and easy reduction in unevenness. It is also preferable to vibrate the carbon fiber bundle during the sizing agent application step using an ultrasonic device.

When used for the method in which the carbon fiber bundle is immersed in a sizing agent solution via rollers, the sizing agent solution preferably has a concentration of 1 mass % or less. A concentration of 1 mass % or less is preferable because the solid deposit will account for about 0.5 part by mass or less relative to 100 parts by mass of the sizing agent-coated carbon fiber bundle, making it possible to produce a sizing agent-coated carbon fiber bundle having high spreadability. It is more preferable for the sizing agent solution to have a concentration of 0.4 mass % or less.

A concentration of 0.4 mass % or less is preferable because the solid deposit will account for about 0.1 part by mass or less relative to 100 parts by mass of the sizing agent-coated carbon fiber bundle, making it possible to produce a sizing agent-coated carbon fiber bundle having higher spreadability.

For the present invention, it is preferable that the application of a sizing agent solution is followed by carrying out a contact type drying method, such as bringing the carbon fiber bundle into contact with a heated roller, to provide a sizing agent-coated carbon fiber bundle. When introduced onto a heated roller, the carbon fiber bundle is pressed toward the heated roller by a tension and dried rapidly and therefore, the carbon fiber bundle forms a flattened shape and easily fixed by the sizing agent as it is spread by the heated roller. When the carbon fiber bundle is in a flattened shape, the contact area among single fibers tends to be small to ensure high spreadability.

The process for the present invention may include a preliminary drying step in which the bundle is moved to pass on a heated roller, followed by a second drying step for additional heat treatment. The second drying step may adopt either a contact type or a noncontact type heat treatment method for heating. Such heat treatment serves for further removal of the diluent solvent remaining in the sizing agent so that the viscosity of the sizing agent is stabilized to ensure stable enhancement of spreadability. The heat treatment temperature is preferably in the range of 20° C. to 250° C. When it is 20° C. or more, the remaining diluent solvent will be removed efficiently to ensure easy enhancement of the spreadability. On the other hand, control of the heat treatment temperature at 250° C. (upper limit) or less can serve for depression of the heat degradation of components of the sizing agent or crosslinking and viscosity increase due to self-polymerization, thus ensuring easy enhancement of the spreadability. It is preferably 165° C. or less and more preferably 135° C. or less.

In that case where a nonionic based surface active agent, particularly a compound (B), is added as a lubricant component in addition to the compound (A) in a quantity range where it does not influence significantly on the effect of the invention, it tends to act for depression of crosslinking and viscosity increase due to self-polymerization of the sizing agent, which ensures easy enhancement of the spreadability, and therefore, the heat treatment temperature range is preferably 230° C. or less and more preferably 215° C. or less.

The aforementioned heat treatment may be realized by exposure to microwave and/or exposure to infrared light.

For the present invention, it is desirable for the sizing agent-coated carbon fiber bundle to be combined with a thermoplastic resin (C) to form a thermoplastic resin composition.

The thermoplastic resin (C) to use for the present invention is preferably at least one thermoplastic resin selected from the group consisting of polyketone resin, polyether ketone resin, polyether nitrile resin, polyimide resin, polyamide-imide resin, polyetherimide resin, polysulfone resin, polyether sulfone resin, polyarylene sulfide resin, polyether ether ketone resin, polyphenylene ether resin, polyoxymethylene resin, polyamide resin, polyester based resin, polycarbonate resin, fluorine based resin, styrene based resin, and polyolefin resin.

For the present invention, it is preferable for the thermoplastic resin (C) to have a glass transition temperature of less than 200° C. because it will allow molding to be performed at a low temperature, serving to decrease the load on the equipment. It is preferable for the thermoplastic resin (C) to have a glass transition temperature of 200° C. or more because the heat resistance and mechanical characteristics will be high in that case, allowing a molded body good in such characteristics to be produced from the thermoplastic resin composition. A thermoplastic resin having a glass transition temperature of 200° C. or more has a high viscosity at that temperature compared to other thermoplastic resins and consequently, there will be problems such as a low impregnatability in the molding step and easy occurrence of irregular impregnation and void formation, but this problem can be solved if a high-spreadability sizing agent-coated carbon fiber bundle according to the present invention is used in combination. The use of a resin as described above is preferable because the resin tends to have good mechanical characteristics such as high bending strength and tensile strength, and a molded body produced from such a thermoplastic resin composition will have high strength. Here, as this thermoplastic resin, it may be good to use a thermoplastic resin that contains a plurality of these resins unless they impair the effect of the present invention.

The thermoplastic resin composition according to the present invention can be used suitably in the form of molding materials such as prepreg and UD tape.

Described next below is a method to produce a molded body from the thermoplastic resin composition according to the present invention. The production method for the molded body according to the present invention includes a step for heating at 300° C. or more in preparing the aforementioned thermoplastic resin composition from a sizing agent-coated carbon fiber bundle and a thermoplastic resin (C). If molding is performed by heating at 300° C. or more in the molding step, it allows the thermoplastic resin to penetrate fully into the fiber bundle and the impregnatability will increase, leading to a thermoplastic resin composition having improved physical properties. In general, an increase in the heating temperature in the molding step can lead to decomposition of some components of the sizing agent to have adverse influence on the molded body, but such adverse influence can be reduced because the deposit of the sizing agent is small in the sizing agent-coated carbon fiber bundle according to the present invention.

Specific example of such a molded body produced by molding the thermoplastic resin composition according to the present invention include not only molded bodies used as final products, but also molding materials (as pellets, stampable sheets, UD tapes, and prepregs) used to produce molded bodies.

Specific examples of such molded bodies according to the present invention include molding materials such as pellets, stampable sheets, UD tapes, and prepregs; cases of electric/electronic instruments such as personal computer, display, OA equipment, portable telephone, portable information device, facsimile, compact disc, portable MD, portable radio cassette, PDA (portable information device such as electronic organizer), video camera, digital still camera, optical equipment, audio, air conditioner, lighting equipment, entertainment goods, toys, and other home electric appliances; internal members thereof such as tray, chassis, and cases and mechanism parts thereof; building materials such as panel; various valves for motor parts, alternator terminal, alternator connector, IC regulator, potentiometer base for light dimmer, suspension parts, and exhaust gas valve; automobile and two-wheel vehicle parts and members such as fuel pipe, various exhaust or based pipes, air intake nozzle snorkel, intake manifold, various arms, various frames, various hinges, various bearings, fuel pump, gasoline tank, CNG tank, engine cooling water joint, carburetor's main body, carburetor's spacer, exhaust gas sensor, cooling water sensor, oil temperature sensor, brake pad wear sensor, throttle position sensor, crank shaft position sensor, air flow meter, brake pad wear sensor, thermostat base for air conditioners, heater's warm air flow control valve, brush holder for radiator motors, water pump impeller, turbine vein, wiper motor related parts, distributor, starter switch, starter relay, wire harness for transmission, wind washer nozzle, air conditioner panel switch substrate, fuel related electromagnetic valve coil, fuse connector, battery tray, AT bracket, head lamp support, pedal housing, steering wheel, door beam, protector, chassis, frame, arm rest, horn terminal, step motor rotor, lamp socket, lamp reflector, lamp housing, brake piston, noise shield, radiator support, spare tire cover, sheet shell, solenoid bobbin, engine oil filter, ignition equipment case, undercover, scuff plate, pillar trim, propeller shaft, wheel, fender, facer, bumper, bumper beam, bonnet, aerodynamic parts, platform, cowl louver, roof, instrument panel, spoiler, and various modules; aircraft related parts such as external plates, landing gear pod, winglet, spoiler, edge, ladder, elevator, fairing, and rib; and molding parts such as windmill blade. In particular, they are used suitably for aircraft members, windmill blade, automobile's external plate, and cases, trays, and chassis for electronic instruments.

EXAMPLES

The present invention will now be illustrated in more detail with reference to examples, but it should be understood that the invention is not construed as being limited to these examples.

<Measuring Method for Weight Average Molecular Weight Mw>

The weight average molecular weight of a sizing agent can be measured by GPC according to a generally known procedure using pullulan as reference material. For the present invention, GPC is carried out under the measuring conditions described below.

Measuring equipment: manufactured by Shimadzu Corporation

Column used: Shodex Asahipac, manufactured by Showa Denko K. K.

GF-710 HQ+GF-510 HQ+GF-310 HQ

Eluant: 0.2 mol % aqueous solution of monoethanol amine (adjusted to pH 5.1 by adding acetic acid)

Reference material: pullulan (manufactured by Sigma-Aldrich)

Detector: differential refractometer (manufactured by Shimadzu Corporation)

<Measuring Method for Viscosity of Sizing Agent>

The viscosity of the sizing agent was measured using a viscoelasticity measuring instrument. The measuring conditions included the use of parallel plates having a diameter of 40 mm, a span of 1 mm, a frequency of 3.14 rad/s, and a measuring temperature of 25° C.

<Measuring Method for Deposit of Sizing Agent>

A sizing coating carbon fiber bundle of 2.0±0.5 g is weighed (W1) (to the fourth decimal place) and left to stand for 15 minutes in an electric furnace (capacity 120 cm$^3$) placed in a nitrogen air flow of 50 mililiters/min at a temperature of 450° C. to ensure complete thermal decomposition of the sizing agent. The carbon fiber bundle is transferred to a container placed in a dry nitrogen flow of 20 liters/min and cooled for 15 minutes and then the weight (W2) of the carbon fiber bundle was measured (to the fourth decimal place), followed by calculating the weight of the sizing agent as W1−W2. This weight of the sizing agent was converted into a value in parts by mass relative to 100 parts by mass of the carbon fiber bundle (round off to the second decimal place) to give the deposit of the sizing agent (in parts by mass). Two measurements were taken and their average was adopted as the deposit of the sizing agent.

<Measuring Method for Average Tearable Distance of Sizing Agent-Coated Carbon Fiber Bundle>

A carbon fiber bundle is cut to a length of 1,160 mm and one end is fixed firmly to a horizontal table using pressure sensitive adhesive tape (this point is referred to as fixation point A). Then, the other (unfixed) end of the fiber bundle is split into two parts with fingers, and either part is strained and fixed firmly to the horizontal table using pressure sensitive adhesive tape (this point is referred to as fixation point B). Then the other of the split parts is moved on the table without a slack in such manner that the fixation point A acts as fulcrum and stopped at a position at a linear distance of 500 mm from the fixation point B, where it fixed firmly to the horizontal table using pressure sensitive adhesive tape (this point is referred to as fixation point C). The region surrounded by the fixation points A, B, and C is observed visually to identify an entangling point that is the farthest from the fixation point A, and it is projected to the straight line connecting the fixation point A and the fixation point B, followed by measuring the distance with a ruler graduated at least in millimeters, which is defined as tearable distance. The above procedure is carried out 30 times repeatedly and the arithmetic average of the measurements is calculated to give the average tearable distance. The measuring method for the tearable distance is illustrated in FIG. 1. For this measuring method, the farthest entangling point from the fixation point A is where there exist three or more entangled slack-free monofilaments that are located farthest in a straight line from the fixation point A.

The average tearable distance was evaluated according to the three stage criteria given below and a specimen rated as A or B was judged to be acceptable.
A: The average tearable distance is 900 mm or more.
B: The average tearable distance is 700 mm or more and less than 900 mm.
C: The average tearable distance is less than 700 mm.
<Measuring Method for Coefficient of Friction Between Fibers>

A sizing agent-coated carbon fiber bundle is wound around an irrotationally fixed bobbin to a uniform thickness of 5 to 10 mm with a winding density in the range of 0.9 to 1.4 g/cm³ and then the same carbon fiber bundle as the wound one is wound around its surface to form a contact angle of 3π (rad) in such a manner that they do not overlap on the circumference. A weight (T1) was attached to one end of the wound carbon fiber bundle and the other end was pulled via a spring balance at a speed of 1 m/min, followed by measuring the tension (T2) at the point where the wound carbon fiber bundle started to move. The interfiber friction coefficient was calculated by the equation given below.

$$\text{Interfiber friction coefficient} = \ln(T2/T1)/\theta$$

T2: tension measured when the carbon fiber bundle starts to move (=reading on the spring balance)
T1: weight (=0.19 g/tex)
θ: total contact angle (=3π rad) between roll and wound thread Two measurements were taken and their average was adopted as the coefficient of friction between fibers. Here, the bobbin used for the measurement was left to stand for 2 hours or more before the measurement under atmospheric temperature and humidity conditions (measuring conditions: 23±3° C., 60±5%).
<Measuring Method for Interfacial Shear Strength (IFSS)>

A single thread was pulled out from a sizing agent-coated carbon fiber bundle, sandwiched between two (upper and lower) laminated resin films, and processed in a hot pressing machine to prepare a molded plate containing an embedded carbon fiber single thread. A dumbbell shaped test piece for IFSS measurement was punched out of the molded plate.

Both ends of the dumbbell shaped test piece were held and a tensile force was applied in the fiber axis direction (length direction) to pull it at a rate of 2.0 mm/min until the strain reached 12%. Subsequently, the interior of the test piece, which had become transparent by heating, was observed under a microscope to determine the lengths of the fragmented fibers. Furthermore, the critical fiber length lc was calculated from the average broken fiber length la by the following equation: lc (μm)=(4/3)×la (μm). The strand tensile strength σ and the carbon fiber single thread diameter d were measured, and the interfacial shear strength (IFSS), which represents the adhesive strength between the carbon fiber and the resin interface, was calculated by the following equation. In Examples, five measures were taken (n=5) and their average was adopted to represent the test results.

$$\text{IFSS (MPa)} = \sigma \text{ (MPa)} \times d \text{ (μm)}/(2 \times lc) \text{ (μm)}$$

For the present invention, preferable IFSS ranges were set up as follows.
Thermoplastic Resin
 polyetherimide: 40 MPa or more
 polyphenylene sulfide: 24 MPa or more
 polypropylene: 15 MPa or more <Measuring Method for Spreadability (Opened Fiber Retention Rate)>

Three sizing agent-coated carbon fiber bundles were cut to a length of 380 mm and put evenly on a piece of thick paper (with a width of 300 mm and a length of 430 mm) spread on a horizontal workbench. Subsequently, the upper ⅓ portions of the end parts of each bundle protruding in the width direction out of the paper were fixed with tape. Then, the lower ⅓ portions of the end parts of the bundle protruding in the width direction were held with both hands and pulled down 80 mm over 3 seconds while maintaining parallelism, followed by releasing them. If the bundle is high in spreadability, the thread maintain the width of 80 mm whereas if the bundle is low in spreadability, the thread contract in the width direction. This procedure was repeated for the three bundles and the thread width was measured for each thread bundle, followed by calculating the average. Finally, the average thread width was divided by 80 mm to calculate the opened fiber retention rate.

The opened fiber retention rate was evaluated according to the three stage criteria given below and a thread rated as A or B was judged to be acceptable.
A: the opened fiber retention rate is 0.95 or more,
B: the opened fiber retention rate is 0.90 or more and less than 0.95,
C: the opened fiber retention rate is less than 0.90.
<Measuring Method for Spreadability (Non-Opened Portions)>

A bobbin carrying a wound sizing agent-coated carbon fiber bundle is put on a creel in the horizontal direction relative to the ground and a 300 mm part of the sizing agent-coated carbon fiber bundle is pulled out from the bobbin. Then, the end of the thread pulled out above is fixed with tape. Subsequently, while allowing the thread bundle to sag by 10 to 20 mm, an air flow with a flow rate of 5 to 10 m/s is applied to the sizing agent-coated carbon fiber bundle to open the fiber. The number of portions where single threads were adhered to adjacent ones with the sizing agent to form bundles (non-opened portions) was counted for evaluation. Here, only those portions having a width of 0.5 mm or more were adopted for evaluation, and each specimen was evaluated for the number of non-opened portions according the four stage criteria given below while taking into account the results of the spreadability (opened fiber retention rate) evaluation described above. A specimen rated as A, B, or C was judged to be acceptable.
A: the number of non-opened portions is 0, and the opened fiber retention rate is 0.95 or more,
B: the number of non-opened portions is 1 or 2, and the opened fiber retention rate is 0.95 or more,
C: the number of non-opened portions is 1 or 2, and the opened fiber retention rate is 0.90 or more and less than 0.95, and
D: the number of non-opened portions is 3 or more, or the opened fiber retention rate is less than 0.90.
<Measuring Method for Spreadability (Spread Fiber Width)>

A 16 cm section of a sizing agent-coated carbon fiber bundle having a size D1 in the width direction of the thread bundle was attached to two cylindrical rods in such a manner that the sizing agent-coated carbon fiber bundle is extended horizontally while maintaining a sag of 1 cm, and an air flow with a flow rate of 5 to 30 m/s was applied to the sizing agent-coated carbon fiber bundle to spread the fiber, followed by measuring the thread width D2 and calculating the spread fiber width (D2/D1). The test procedure was repeated three times and the average was adopted as spread fiber width. For the present invention, the preferable range of spread fiber width was set up to be 3.2 or more.

<Measurement of Glass Transition Temperature of Thermoplastic Resin>

The glass transition temperature of thermoplastic resin was measured by differential scanning calorimetry (DSC). An aluminum sample pan was used and measurements were taken at a heating rate of 40° C./min.

The materials and components used in each Example and Comparative example were as described below.

Component (A)
A-1: Polyethylene Imine
(Mw=1300, viscosity=6,800 mPa·s, γ=61 mJ/m$^2$)
(Lupasol (registered trademark) G20 Waterfree, manufactured by BASF Japan)
A-2: Polyethylene Imine
(Mw=800, viscosity=1,600 mPa·s, γ=62 mJ/m$^2$)
(Lupasol (registered trademark) FG, manufactured by BASF Japan)
A-3: Polyethylene Imine
(Mw=2,000, viscosity: 12,030 mPa·s)
(Lupasol (registered trademark) PR8515, manufactured by BASF Japan)
A-4: Fatty Acid Amide
(Mw=283.5, γ=48 mJ/m$^2$)
(Amaido (registered trademark) AP-1, manufactured by Nippon Kasei Chemical Company Limited)

Component (B)
B-1: PEG Distearic Acid Ester
(formula (I), n=90, $R_1$, $R_2$=17, HLB=17.0)
(IONET (registered trademark) DS4000, manufactured by Sanyo Chemical Industries Ltd.)
B-2: PEG Monostearic Acid Ester
(formula (II), n=22, $R_3$=17, HLB=15.7)
(IONET (registered trademark) MS1000, manufactured by Sanyo Chemical Industries Ltd.)
B-3: PEG Monooleic Acid Ester
(formula (II), n=13, $R_3$=17, HLB=13.7)
(IONET (registered trademark) MO600, manufactured by Sanyo Chemical Industries Ltd.)
B-4: PEG Dioleic Acid Ester
(formula (I), n=13, $R_1$, $R_2$=17, HLB=10.4)
(IONET (registered trademark) DO600, manufactured by Sanyo Chemical Industries Ltd.)
B-5: PEG Distearic Acid Ester
(formula (I), n=9, $R_1$, $R_2$=17, HLB=8.5)
(IONET (registered trademark) DS400, manufactured by Sanyo Chemical Industries Ltd.)
B-6: PEG Dioleic Acid Ester
(formula (I), n=9, $R_1$, $R_2$=17, HLB=8.4)
(IONET (registered trademark) DO400, manufactured by Sanyo Chemical Industries Ltd.)

Component (C): Thermoplastic Resin
C-1: Polyetherimide
(glass transition temperature 217° C.)
(SUPERIO (registered trademark) Type E, manufactured by Mitsubishi Plastics, Inc.)
C-2: Polyphenylene Sulfide
(glass transition temperature 89° C.)
(DURAFIDE (registered trademark) PPS W-540, manufactured by Polyplastics Co., Ltd.)
C-3: Polypropylene
(glass transition temperature −2° C.)
(Polypropylene J106 G, manufactured by Prime Polymer Co., Ltd.)

<Other Components>
polyglycerol poly glycidyl ester
(Denacol (registered trademark) Ex-314, manufactured by Nagase ChemteX Corporation)
PEG
(PEG600, manufactured by Sanyo Chemical Industries Ltd.)
In Examples and Comparative examples, PEG is included in calculation as a compound (B) component.

Example 1

The procedure in this Example includes the first to fourth steps described below.

First Step: A Carbon Fiber Bundle to Use as Base Material is Produced in this Step.

An acrylonitrile copolymer was spun and calcined to prepare a carbon fiber bundle containing a total of 12,000 filaments and having a total fineness of 800 tex, a strand tensile strength of 5.1 GPa, and a strand tensile modulus of 240 GPa. Subsequently, the carbon fiber bundle was subjected to electrolytic surface treatment with an electric quantity of 80 coulombs per gram of the carbon fiber bundle using an aqueous solution of ammonium hydrogen carbonate as electrolyte. After the electrolytic surface treatment, the carbon fiber bundle was rinsed and dried in heated air to provide a carbon fiber bundle to use as base material.

Second Step: A Sizing Agent is Deposited on the Carbon Fiber Bundle in this Step.

(A-1) was used as compound (A), and this (A-1) was mixed with water to prepare an about 0.2 mass % aqueous solution containing (A-1) in a uniformly dissolved state. Using this aqueous solution as an aqueous sizing agent solution, the surface-treated carbon fiber bundle was coated with the sizing agent by the immersion coating method and heat-treated on a hot roller at a temperature of 120° C. for 15 seconds as a preliminary drying step, followed by heat treatment in heated air at a temperature of 210° C. for 90 seconds as a second drying step to provide a sizing agent-coated carbon fiber bundle. The deposit of the sizing agent was controlled so that it would account for 0.09 part by mass relative to the total quantity, which accounts for 100 parts by mass, of the surface-treated sizing agent-coated carbon fiber bundle.

In this instance, the carbon fiber bundle had an average tearable distance of 1,000 mm.

Third Step: Spreadability Test Sample Preparation and Evaluation

The carbon fiber bundle obtained in the second step was examined according to the spreadability evaluation method to determine its opened fiber retention rate and the number of non-opened portions. Evaluation results showed that there was one non-opened portion and the opened fiber retention rate was 0.94, indicating a very high spreadability.

Fourth Step: IFSS Measurement Test Piece Preparation and Evaluation

Using the carbon fiber bundle prepared in the above step and (C-1) as the thermoplastic resin (C), a test piece for IFSS measurement was prepared according to the interfacial shear strength measurement method. The heating and compression conditions in the hot pressing machine included 320° C. and 2.0 MPa.

Subsequently, the resulting test piece for IFSS measurement was used to measure the IFSS. Results showed that the IFSS was 43 MPa, indicating a sufficiently high adhesiveness. Results obtained above are summarized in Table 1.

TABLE 1

| | | Example 1 | Example 2 | Example 3 | Example 4 | Example 5 | Comparative example 1 | Comparative example 2 | Comparative example 3 | Comparative example 4 | Comparative example 5 |
|---|---|---|---|---|---|---|---|---|---|---|---|
| Compound (A) | Mw (−) | 1,300 | 1,300 | 800 | 1,300 | 1,300 | 1,300 | 2,000 | 1,300 | 1,300 | — |
| | viscosity (mPa·s) | 6,800 | 6,800 | 1,600 | 6,800 | 6,800 | 6,800 | 12,030 | 6,800 | 6,800 | — |
| | deposit (parts by mass) | 0.09 | 0.07 | 0.08 | 0.09 | 0.07 | 0.12 | 0.08 | 0.02 | 0.12 | 0 |
| Sizing agent-coated carbon fiber bundle | average tearable distance | A | A | A | A | B | A | A | A | B | A |
| | spreadability (opened fiber retention rate) | B | A | A | B | B | C | C | A | C | A |
| | spreadability (non-opened portions) | C | B | B | C | C | D | D | A | D | A |
| Molded body | thermoplastic resin (C) | C-1 | C-1 | C-1 | C-2 | C-1 | C-1 | C-1 | C-1 | C-1 | C-1 |
| | IFSS (MPa) | 43 | 43 | 40 | 24 | 43 | 43 | 40 | 36 | 43 | 32 |

Example 2

Except that in the second step, the deposit of the sizing agent was adjusted to 0.07 part by mass relative to the total quantity, which accounted for 100 parts by mass, of the sizing agent-coated carbon fiber bundle, the same procedure as in Example 1 was carried out to produce a sizing agent-coated carbon fiber bundle, which was then subjected to various evaluations. Results are summarized in Table 1, showing that the carbon fiber bundle obtained had very high adhesiveness and spreadability.

Example 3

Except that in the second step, (A-2) was used as the compound (A) and that the deposit of the sizing agent added adjusted to 0.08 part by mass relative to the total quantity, which accounted for 100 parts by mass, of the sizing agent-coated carbon fiber bundle, the same procedure as in Example 1 was carried out to produce a sizing agent-coated carbon fiber bundle, which was then subjected to various evaluations. Results are summarized in Table 1, showing that the carbon fiber bundle obtained had very high adhesiveness and spreadability.

Example 4

Except that in the fourth step, (C-2) was used as the thermoplastic resin (C), the same procedure as in Example 1 was carried out to produce a sizing agent-coated carbon fiber bundle and a test piece for IFSS measurement, which were then subjected to various evaluations. Results are summarized in Table 1, showing that the carbon fiber bundle obtained had very high adhesiveness and sufficiently high spreadability.

Example 5

Except that in the first step, entangling treatment was carried out in producing a carbon fiber bundle, the same procedure as in Example 2 was carried out to produce a sizing agent-coated carbon fiber bundle, which was then subjected to various evaluations. Results are summarized in Table 1, showing that the carbon fiber bundle obtained had sufficiently high adhesiveness and spreadability.

Example 6

Except that in the second step, drying was carried out at a temperature of 120° C. in the second drying step, the same procedure as in Example 1 was carried out to produce a sizing agent-coated carbon fiber bundle, which was then subjected to various evaluations. Results are summarized in Table 2, showing that the carbon fiber bundle obtained had very high adhesiveness and spreadability.

TABLE 2

| | | Example 6 | Example 7 | Example 8 | Example 9 | Example 10 | Example 11 | Example 12 |
|---|---|---|---|---|---|---|---|---|
| Compound (A) | Mw (−) | 1,300 | 1,300 | 1,300 | 1,300 | 1,300 | 1,300 | 1,300 |
| | viscosity (mPa·s) | 6,800 | 6,800 | 6,800 | 6,800 | 6,800 | 6,800 | 6,800 |
| | deposit (parts by mass) | 0.09 | 0.07 | 0.06 | 0.06 | 0.09 | 0.09 | 0.09 |
| Compound (B) | additive type | — | — | IONET DS4,000 | IONET DS4,000 | IONET DS4,000 | IONET DS4,000 | — |
| | quantity added (B/(A+ B)) | — | — | 0.15 | 0.15 | 0.15 | 0.15 | — |
| Production method | drying temperature in second drying step (° C.) | 120 | 25 | 80 | 210 | 210 | 260 | 260 |
| Sizing agent-coated carbon fiber bundle | average tearable distance | A | A | A | A | A | A | A |
| | spreadability (opened fiber retention rate) | A | A | A | A | A | B | B |
| | spreadability (non-opened portions) | A | A | A | A | B | C | C |

TABLE 2-continued

|  |  | Example 6 | Example 7 | Example 8 | Example 9 | Example 10 | Example 11 | Example 12 |
|---|---|---|---|---|---|---|---|---|
| Molded body | thermoplastic resin (C) | C-1 | C-1 | C-1 | C-1 | C-1 | C-1 | C-1 |
|  | IFSS (MPa) | 43 | 43 | 43 | 43 | 43 | 43 | 43 |

Example 7

Except that in the second step, drying was carried out at a temperature of 25° C. in the second drying step, the same procedure as in Example 2 was carried out to produce a sizing agent-coated carbon fiber bundle, which was then subjected to various evaluations. Results are summarized in Table 2, showing that the carbon fiber bundle obtained had very high adhesiveness and spreadability.

Example 8

In the second step, (A-1) and (B-1) were used, and (A-1), (B-1), and water were mixed together in such a manner that the compound (B-1) was to account for 15 parts by mass relative to the total quantity, which accounts for 100 parts by mass, of the sizing agent excluding the solvent and dissolved uniformly to prepare an about 0.1 mass % aqueous solution. Except that this aqueous solution was used as an aqueous sizing agent solution and that drying was carried out at a temperature of 80° C. in the second drying step, the same procedure as in Example 1 was carried out to produce a sizing agent-coated carbon fiber bundle, which was then subjected to various evaluations. Results are summarized in Table 2, showing that the carbon fiber bundle obtained had very high adhesiveness and spreadability.

Example 9

Except that in the second step, the second drying was carried out at a temperature of 210° C. and that the deposit of the sizing agent was adjusted to 0.06 part by mass relative to the total quantity, which accounted for 100 parts by mass, of the sizing agent-coated carbon fiber bundle, the same procedure as in Example 8 was carried out to produce a sizing agent-coated carbon fiber bundle, which was then subjected to various evaluations. Results are summarized in Table 2, showing that the carbon fiber bundle obtained had very high adhesiveness and spreadability.

Example 10

Except that in the second step, the second drying was carried out at a temperature of 210° C. and that the deposit of the sizing agent was adjusted to 0.09 part by mass relative to the total quantity, which accounted for 100 parts by mass, of the sizing agent-coated carbon fiber bundle, the same procedure as in Example 8 was carried out to produce a sizing agent-coated carbon fiber bundle, which was then subjected to various evaluations. Results are summarized in Table 2, showing that the carbon fiber bundle obtained had very high adhesiveness and spreadability.

Example 11

Except that in the second step, the second drying was carried out at a temperature of 260° C. and that the deposit of the sizing agent was adjusted to 0.09 part by mass relative to the total quantity, which accounted for 100 parts by mass, of the sizing agent-coated carbon fiber bundle, the same procedure as in Example 8 was carried out to produce a sizing agent-coated carbon fiber bundle, which was then subjected to various evaluations. Results are summarized in Table 2, showing that the carbon fiber bundle obtained had very high adhesiveness and sufficiently high spreadability.

Example 12

Except that in the second step, drying was carried out at a temperature of 260° C. in the second drying step, the same procedure as in Example 1 was carried out to produce a sizing agent-coated carbon fiber bundle, which was then subjected to various evaluations. Results are summarized in Table 2, showing that the carbon fiber bundle obtained had very high adhesiveness and sufficiently high spreadability.

Comparative Example 1

Except that in the second step, the deposit of the sizing agent was adjusted to 0.12 part by mass relative to the total quantity, which accounted for 100 parts by mass, of the sizing agent-coated carbon fiber bundle, the same procedure as in Example 1 was carried out to produce a sizing agent-coated carbon fiber bundle, which was then subjected to various evaluations. Results are summarized in Table 1, showing that the carbon fiber bundle obtained had very high adhesiveness though its spreadability was low.

Comparative Example 2

Except that in the second step, (A-3) was used as the compound (A) and that the deposit of the sizing agent was adjusted to 0.08 part by mass relative to the total quantity, which accounted for 100 parts by mass, of the sizing agent-coated carbon fiber bundle, the same procedure as in Example 1 was carried out to produce a sizing agent-coated carbon fiber bundle, which was then subjected to various evaluations. Results are summarized in Table 1, showing that the carbon fiber bundle obtained had very high adhesiveness though its spreadability was low.

Comparative Example 3

Except that in the second step, the deposit of the sizing agent was adjusted to 0.02 part by mass relative to the total quantity, which accounted for 100 parts by mass, of the sizing agent-coated carbon fiber bundle, the same procedure as in Example 1 was carried out to produce a sizing agent-coated carbon fiber bundle, which was then subjected to various evaluations. Results are summarized in Table 1, showing that the carbon fiber bundle obtained had low adhesiveness and very high spreadability.

Comparative Example 4

Except that in the second step, the deposit of the sizing agent was adjusted to 0.12 part by mass relative to the total quantity, which accounted for 100 parts by mass, of the sizing agent-coated carbon fiber bundle, the same procedure as in Example 5 was carried out to produce a sizing agent-coated carbon fiber bundle, which was then subjected to various evaluations. Results are summarized in Table 1, showing that the carbon fiber bundle obtained had very high adhesiveness though its spreadability was low.

Comparative Example 5

Except that in the second step, deposition of a sizing agent was omitted, the same procedure as in Example 1 was carried out to produce a sizing agent-coated carbon fiber bundle, which was then subjected to various evaluations. Results are summarized in Table 1, showing that the carbon fiber bundle obtained had very high spreadability though the molded body obtained when using (B-1) as the (B) component had low interface shear strength.

TABLE 3

|  |  | Example 13 | Comparative example 7 |
|---|---|---|---|
| Compound (A) | Mw (—) | 1,300 | 1,300 |
|  | viscosity (mPa · s) | 6,800 | 6,800 |
|  | deposit (parts by mass) | 0.07 | 0.12 |
| Sizing agent-coated carbon fiber bundle | average tearable distance | A | A |
|  | spreadability (opened fiber retention rate) | A | C |
|  | spreadability (non-opened portions) | B | D |
| Molded body | thermoplastic resin (C) | C-1 | C-1 |
|  | voids | absent | present |

Example 13

In this Example, the following procedure was carried out to prepare a thermoplastic resin's molded body.

First, sizing agent-coated carbon fiber bundles as produced in Example 2 were laid out to prepare carbon fiber sheets. Subsequently, four such carbon fiber sheets and five films of the thermoplastic resin (C-1) having a thickness of 30 μm were stacked alternately. The film stack was put in a hydraulic vacuum molding machine heated at 370° C. and preheated for 4 minutes in a vacuum. It was pressed at 10 MPa for 4 minutes and then cooled at 30° C. for 2 minutes, followed by releasing it to provide an intended thermoplastic resin's molded body.

It was found that the above thermoplastic resin composition was free of internal voids and very high in impregnatability. Results obtained above are summarized in Table 3.

Comparative Example 7

Except for using sizing agent-coated carbon fiber bundles as prepared in Comparative example 1, the same procedure as in Example 9 was carried out to produce a thermoplastic resin composition. Results obtained above are summarized in Table 3, showing that the above thermoplastic resin's molded body had internal voids and was low in impregnatability.

Example 14

The procedure in this Example includes the first to fourth steps described below.

First Step: A Carbon Fiber Bundle to Use as Base Material is Produced in this Step.

An acrylonitrile copolymer was spun and calcined to prepare a carbon fiber bundle containing a total of 12,000 filaments and having a total fineness of 800 tex, a strand tensile strength of 5.1 GPa, and a strand tensile modulus of 240 GPa. Then, the carbon fiber bundle was subjected to electrolytic surface treatment with an electric quantity of 80 coulombs per gram of the carbon fiber bundle using an aqueous solution of ammonium hydrogen carbonate as electrolyte. After the electrolytic surface treatment, the carbon fiber bundle was rinsed and dried in heated air to provide a carbon fiber bundle to use as base material.

Second Step: A Sizing Agent is Deposited on the Carbon Fiber Bundle in this Step.

(A-1) was used as the compound (A) and (B-1) was used as the compound (B) and mixed in amounts as shown in Table 4, followed by adding water to prepare an about 0.8 mass % aqueous solution containing (A-1) and (B-1) in a uniformly dissolved state. Using this aqueous solution as an aqueous sizing agent solution, the surface-treated carbon fiber bundle was coated with the sizing agent by the immersion coating method and dried on a hot roller and in heated air to provide a sizing agent-coated carbon fiber bundle. The deposit of the sizing agent was controlled so that it would account for 0.3 part by mass relative to the total quantity, which accounts for 100 parts by mass, of the surface-treated sizing agent-coated carbon fiber bundle.

Third Step: Spreadability Test Sample Preparation and Evaluation

The carbon fiber bundle obtained in the second step was examined according to the spreadability evaluation method to determine its opened fiber width. Results show that the opened fiber width was 5.1, indicating a very high spreadability.

Fourth Step: IFSS Measurement Test Piece Preparation and Evaluation

Using the carbon fiber bundle prepared in the above step and (C-1) as the thermoplastic resin (C), a test piece for IFSS measurement was prepared according to the interfacial shear strength measurement method. The heating conditions in the hot pressing machine included 320° C.

Subsequently, the resulting test piece for IFSS measurement was used to measure the IFSS. Results showed that the IFSS was 43 MPa, indicating a sufficiently high adhesiveness. Results obtained above are summarized in Table 4.

TABLE 4

|  |  |  |  |  | Example 14 | Example 15 | Example 16 | Example 17 | Example 18 | Example 19 | Example 20 | Comp. example 8 | Comp. example 9 |
|---|---|---|---|---|---|---|---|---|---|---|---|---|---|
| Sizing agent | compound (A) | A-1 | parts by mass | polyethyleneimine (Mw = 1,300) | 75 | 75 | 75 | 75 | 75 |  |  | 75 | 75 |
|  |  | A-2 | parts by mass | polyethyleneimine (Mw = 800) |  |  |  |  |  | 75 |  |  |  |
|  |  | A-4 | parts by mass | stearic acid amide |  |  |  |  |  |  | 75 |  |  |

TABLE 4-continued

| | | Unit | | Example 14 | Example 15 | Example 16 | Example 17 | Example 18 | Example 19 | Example 20 | Comp. example 8 | Comp. example 9 |
|---|---|---|---|---|---|---|---|---|---|---|---|---|
| com-pound (B) | B-1 | parts by mass | PEG distearic acid ester (IONET DS4,000, n = 90) | 25 | | | | | 25 | 25 | | |
| | B-2 | parts by mass | PEG monostearic acid ester (IONET MS1,000, n = 22) | | 25 | | | | | | | |
| | B-3 | parts by mass | PEG monooleic acid ester (IONET MO600, n = 13) | | | 25 | | | | | | |
| | B-4 | parts by mass | PEG dioleic acid ester (IONET DO600, n = 13) | | | | 25 | | | | | |
| | B-5 | parts by mass | PEG stearic acid ester (IONET DS400, n = 9) | | | | | 25 | | | | |
| | B-6 | parts by mass | PEG dioleic acid ester (IONET DO400, n = 9) | | | | | | | | 25 | |
| other | | parts by mass | PEG | | | | | | | | | 25 |
| SP value (A) | | $(J/cm^3)^{0.5}$ | | 22.1 | 22.1 | 22.1 | 22.1 | 22.1 | 22.1 | 20 | 22.1 | 22.1 |
| (B) | | $(J/cm^3)^{0.5}$ | | 19 | 19.8 | 19.3 | 18.1 | 18.4 | 19 | 19 | 17.9 | 21.7 |
| (A) − (B) | | $(J/cm^3)^{0.5}$ | | 3.1 | 2.3 | 2.8 | 4 | 3.7 | 3.1 | 1 | 4.2 | 0.4 |
| $W_B/(W_A + W_B)$ | | — | | 0.25 | 0.25 | 0.25 | 0.25 | 0.25 | 0.25 | 0.25 | 0.25 | 0.25 |
| Surface free energy of compound (A) | | $mJ/m^2$ | | 61 | 61 | 61 | 61 | 61 | 62 | 48 | 61 | 61 |
| HLB of compound (B) | | — | | 17.0 | 15.7 | 13.7 | 10.4 | 8.5 | 17.0 | 17.0 | 8.4 | (20) |
| Melting point of compound (B) | | °C. | | 48 | 41 | 15 | 21 | <10 | 48 | 48 | <10 | 20 |
| n of compound (B) | | | | 90 | 22 | 13 | 13 | 9 | 90 | 90 | 4 | 13 |
| Deposit of sizing agent | | parts by mass/ 100 parts by mass of carbon fiber | | 0.3 | 0.3 | 0.3 | 0.3 | 0.3 | 0.3 | 0.3 | 0.3 | 0.3 |
| Thermoplastic resin (C) | C-1 | | polyether- imide (glass transition temperature 217° C.) | ○ | ○ | ○ | ○ | ○ | ○ | ○ | ○ | ○ |
| Interfiber friction coefficient | | — | | 0.22 | 0.26 | 0.23 | 0.2 | 0.24 | 0.24 | 0.22 | 0.22 | 0.3 |
| Interfacial shear strength (IFSS) | | MPa | | 43 | 43 | 42 | 42 | 42 | 38 | 40 | 42 | 42 |
| Spreadability (spread fiber width) | | — | | 5.1 | 5.2 | 4.8 | 4.2 | 3.9 | 5.2 | 5 | 3.0 | 2.1 |

Examples 15 to 20

Except that in the second step, the components of the sizing agent used were as shown in Table 4, the same procedure as in Example 14 was carried out to produce a sizing agent-coated carbon fiber bundle, which was then subjected to various evaluations. Results are summarized in Table 4, showing that the carbon fiber bundle obtained had sufficiently high adhesiveness and spreadability.

Comparative Examples 8 and 9

Except that in the second step, the components of the sizing agent used were as shown in Table 4, the same procedure as in Example 14 was carried out to produce a sizing agent-coated carbon fiber bundle, which was then subjected to various evaluations. Results are summarized in Table 4, indicating insufficient spreadability.

Examples 21 to 24

Except that in the second step, the components of the sizing agent used were as shown in Table 5, the same procedure as in Example 14 was carried out to produce a sizing agent-coated carbon fiber bundle, which was then subjected to various evaluations. Results are summarized in Table 5, showing that the carbon fiber bundle obtained had sufficiently high adhesiveness and spreadability.

TABLE 5

| | | | Unit | | Example 14 | Example 21 | Example 22 | Example 23 | Example 24 | Comparative example 10 | Comparative example 11 | Comparative example 12 |
|---|---|---|---|---|---|---|---|---|---|---|---|---|
| Sizing agent | compound (A) | A-1 | parts by mass | polyethyleneimine (Mw = 1,300) | 75 | 90 | 50 | 60 | 60 | 25 | | 95 |
| | compound (B) | B-1 | parts by mass | PEG distearic acid ester (IONET DS4,000, n = 90) | 25 | 10 | 50 | 20 | 20 | 75 | 100 | 5 |
| | other | | parts by mass | polyglycerol polyglycidyl ether | | | | | 20 | | | |
| | | | parts by mass | PEG | | | | | | 20 | | |
| SP value | (A) | | $(J/cm^3)^{0.5}$ | | 22.1 | 22.1 | 22.1 | 22.1 | 22.1 | 22.1 | — | 22.1 |
| | (B) | | $(J/cm^3)^{0.5}$ | | 19 | 19 | 19 | 19 | 20.4 | 19 | 19 | 19 |
| | (A) − (B) | | $(J/cm^3)^{0.5}$ | | 3.1 | 3.1 | 3.1 | 3.1 | 1.7 | 3.1 | — | 3.1 |
| $W_B/(W_A + W_B)$ | | | — | | 0.25 | 0.1 | 0.5 | 0.25 | 0.25 | 0.75 | 1 | 0.05 |
| Surface free energy of compound (A) | | | $mJ/m^2$ | | 61 | 61 | 61 | 61 | 61 | 61 | — | 61 |
| HLB of compound (B) | | | — | | 17.0 | 17.0 | 17.0 | 17.0 | 17.0 | 17.0 | 17.0 | 17.0 |
| Melting point of compound (B) | | | °C. | | 48 | 48 | 48 | 48 | 48 | 48 | 48 | 48 |
| n of compound (B) | | | | | 90 | 90 | 90 | 90 | 90 | 90 | 90 | 90 |
| Deposit of sizing agent | | | parts by mass/ 100 parts by mass of carbon fiber | | 0.3 | 0.3 | 0.3 | 0.3 | 0.3 | 0.3 | 0.3 | 0.3 |
| Thermoplastic resin (C) | | C-1 | | polyetherimide (glass transition temperature 217° C.) | ○ | ○ | ○ | ○ | ○ | ○ | ○ | ○ |
| Interfiber friction coefficient | | | — | | 0.22 | 0.28 | 0.21 | 0.23 | 0.22 | 0.2 | 0.2 | 0.37 |
| Interfacial shear strength (IFSS) | | | MPa | | 43 | 42 | 42 | 42 | 40 | 37 | 34 | 43 |
| Spreadability (spread fiber width) | | | — | | 5.1 | 3.3 | 5.4 | 3.5 | 3.8 | 5.4 | 5.4 | 2.9 |

| | | | Unit | | Comparative example 13 | Comparative example 14 | Example 25 | Example 26 | Example 27 | Example 28 | Example 29 |
|---|---|---|---|---|---|---|---|---|---|---|---|
| Sizing agent | compound (A) | A-1 | parts by mass | polyethyleneimine (Mw = 1,300) | 100 | 30 | 75 | 75 | 75 | 70 | 90 |
| | compound (B) | B-1 | parts by mass | PEG distearic acid ester (IONET DS4,000, n = 90) | | 10 | 25 | 25 | 25 | 30 | 10 |
| | other | | parts by mass | polyglycerol polyglycidyl ether | | | | | | | |
| | | | parts by mass | PEG | | 60 | | | | | |
| SP value | (A) | | $(J/cm^3)^{0.5}$ | | 22.1 | 22.1 | 22.1 | 22.1 | 22.1 | 22.1 | 22.1 |
| | (B) | | $(J/cm^3)^{0.5}$ | | — | 21.3 | 19 | 19 | 19 | 19 | 19 |
| | (A) − (B) | | $(J/cm^3)^{0.5}$ | | — | 0.8 | 3.1 | 3.1 | 3.1 | 3.1 | 3.1 |
| $W_B/(W_A + W_B)$ | | | — | | 0 | 0.25 | 0.25 | 0.25 | 0.25 | 0.3 | 0.1 |
| Surface free energy of compound (A) | | | $mJ/m^2$ | | 61 | 61 | 61 | 61 | 61 | 61 | 61 |
| HLB of compound (B) | | | — | | — | 17.0 | 17.0 | 17.0 | 17.0 | 17.0 | 17.0 |
| Melting point of compound (B) | | | °C. | | — | 48 | 48 | 48 | 48 | 48 | 48 |
| n of compound (B) | | | | | — | 90 | 90 | 90 | 90 | 90 | 90 |
| Deposit of sizing agent | | | parts by mass/ 100 parts by mass of carbon fiber | | 0.3 | 0.3 | 0.1 | 0.8 | 1.5 | 0.09 | 0.07 |

TABLE 5-continued

| | | | | | | | | | | |
|---|---|---|---|---|---|---|---|---|---|---|
| Thermoplastic resin (C) | C-1 | | polyetherimide (glass transition temperature 217° C.) | ○ | ○ | ○ | ○ | ○ | ○ | ○ |
| Interfiber friction coefficient | | — | | 0.38 | 0.3 | 0.33 | 0.22 | 0.22 | 0.29 | 0.34 |
| Interfacial shear strength (IFSS) | | MPa | | 43 | 37 | 42 | 42 | 42 | 43 | 43 |
| Spreadability (spread fiber width) | | — | | 2.2 | 2.9 | 5.5 | 4.5 | 3.8 | 5.6 | 5.7 |

Comparative Examples 10 and 11

Except that in the second step, the components of the sizing agent used were as shown in Table 5, the same procedure as in Example 14 was carried out to produce a sizing agent-coated carbon fiber bundle, which was then subjected to various evaluations. Results are summarized in Table 5, indicating insufficient adhesiveness.

Comparative Examples 12 to 14

Except that in the second step, the components of the sizing agent used were as shown in Table 5, the same procedure as in Example 14 was carried out to produce a sizing agent-coated carbon fiber bundle, which was then subjected to various evaluations. Results are summarized in Table 5, indicating insufficient spreadability.

Examples 25 to 27

Except that in the second step, the deposit of the sizing agent was adjusted to the proportions given in Table 5 relative to the total quantity, which accounted for 100 parts by mass, of the sizing agent-coated carbon fiber bundle, the same procedure as in Example 14 was carried out to produce a sizing agent-coated carbon fiber bundle, which was then subjected to various evaluations. Results are summarized in Table 5, showing that the carbon fiber bundle obtained had sufficiently high adhesiveness and spreadability.

Examples 28 and 29

Except that in the second step, the components of the sizing agent used were as shown in Table 5 and that the deposit thereof was adjusted to the proportions given in Table 5 relative to the total quantity, which accounted for 100 parts by mass, of the sizing agent-coated carbon fiber bundle, the same procedure as in Example 14 was carried out to produce a sizing agent-coated carbon fiber bundle, which was then subjected to various evaluations. Results are summarized in Table 5, showing that the carbon fiber bundle obtained had sufficiently high adhesiveness and spreadability.

Example 30

Except that in the fourth step, (C-2) was used as the thermoplastic resin (C), the same procedure as in Example 14 was carried out to produce a sizing agent-coated carbon fiber bundle and a test piece for IFSS measurement, which were then subjected to various evaluations. Results are summarized in Table 6, showing that the carbon fiber bundle obtained had sufficiently high adhesiveness and sufficiently high spreadability.

TABLE 6

| | | | | | Unit | | Example 30 | Comparative example 15 | Comparative example 16 | Example 31 | Comparative example 17 | Comparative example 18 |
|---|---|---|---|---|---|---|---|---|---|---|---|---|
| Sizing agent | compound (A) | A-1 | | parts by mass | | polyethyleneimine (Mw = 1,300) | 75 | 25 | 95 | 75 | 25 | 95 |
| | compound (B) | B-1 | | parts by mass | | PEG distearic acid ester (IONET DS4,000, n = 90) | 25 | 75 | 5 | 25 | 75 | 5 |
| SP value | (A) | | | $(J/cm^3)^{0.5}$ | | | 22.1 | 22.1 | 22.1 | 22.1 | 22.1 | 22.1 |
| | (B) | | | $(J/cm^3)^{0.5}$ | | | 19 | 19 | 19 | 19 | 19 | 19 |
| | (A) − (B) | | | $(J/cm^3)^{0.5}$ | | | 3.1 | 3.1 | 3.1 | 3.1 | 3.1 | 3.1 |
| $W_B/(W_A + W_B)$ | | | | — | | | 0.25 | 0.75 | 0.03 | 0.25 | 0.75 | 0.03 |
| Surface free energy of compound (A) | | | | $mJ/m^2$ | | | 61 | 61 | 61 | 61 | 61 | 61 |
| HLB of compound (B) | | | | — | | | 17.0 | 17.0 | 17.0 | 17.0 | 17.0 | 17.0 |
| Melting point of compound (B) | | | | ° C. | | | 48 | 48 | 48 | 48 | 48 | 48 |
| n of compound (B) | | | | | | | 90 | 90 | 90 | 90 | 90 | 90 |
| Deposit of sizing agent | | | | parts by mass/ 100 parts by mass of carbon fiber | | | 0.3 | 0.3 | 0.3 | 0.3 | 0.3 | 0.3 |

TABLE 6-continued

|  | Unit |  |  | Example 30 | Comparative example 15 | Comparative example 16 | Example 31 | Comparative example 17 | Comparative example 18 |
|---|---|---|---|---|---|---|---|---|---|
| Thermoplastic resin (C) | C-1 |  | polyetherimide (glass transition temperature 217° C.) |  |  |  |  |  |  |
|  | C-2 |  | polyphenylene sulfide (glass transition temperature 89° C.) | ○ | ○ | ○ |  |  |  |
|  | C-3 |  | polypropylene (glass transition temperature −2° C.) |  |  |  | ○ | ○ | ○ |
| Interfiber friction coefficient | — |  |  | 0.22 | 0.2 | 0.37 | 0.22 | 0.2 | 0.37 |
| Interfacial shear strength (IFSS) | MPa |  |  | 24 | 20 | 24 | 16 | 10 | 16 |
| Spreadability (spread fiber width) | — |  |  | 5.1 | 5.4 | 2.9 | 5.1 | 5.4 | 2.9 |

Comparative Examples 15 and 16

Except that in the second step, the components of the sizing agent used were as shown in Table 6, the same procedure as in Example 23 was carried out to produce a sizing agent-coated carbon fiber bundle, which was then subjected to various evaluations. Results are summarized in Table 6, indicating insufficient adhesiveness or spreadability.

Example 31

Except that in the fourth step, (C-3) was used as the thermoplastic resin (C) that hot pressing was performed at a heating temperature of 220° C., the same procedure as in Example 14 was carried out to produce a sizing agent-coated carbon fiber bundle and a test piece for IFSS measurement, which were then subjected to various evaluations. Results are summarized in Table 6, showing that the carbon fiber bundle obtained had sufficiently high adhesiveness and sufficiently high spreadability.

Comparative Examples 17 and 18

Except that in the second step, the components of the sizing agent used were as shown in Table 6, the same procedure as in Example 31 was carried out to produce a sizing agent-coated carbon fiber bundle, which was then subjected to various evaluations. Results are summarized in Table 6, indicating insufficient adhesiveness or spreadability.

Example 32

In this Example, the following procedure was carried out to prepare a molded body.

First, sizing agent-coated carbon fiber bundles as produced in Example 14 were laid out to prepare a carbon fiber sheet. Subsequently, four such carbon fiber sheets and five sheets of the thermoplastic resin (C-1) having a thickness of 30 μm were stacked alternately. The film stack was put in a hydraulic vacuum molding machine heated at 370° C. and preheated for 4 minutes in a vacuum. It was pressed at 10 MPa for 4 minutes and then cooled at 30° C. for 2 minutes, followed by releasing it to provide an intended molded body.

It was found that the above molded body was free of internal voids and very high in impregnatability. Results obtained above are summarized in Table 7.

TABLE 7

|  |  |  | Unit |  | Example 32 | Comparative example 19 |
|---|---|---|---|---|---|---|
| Sizing agent | compound (A) | A-1 | parts by mass | polyethyleneimine (Mw = 1,300) | 75 | 100 |
|  | compound (B) | B-1 | parts by mass | PEG distearic acid ester (IONET DS4,000, n = 90) | 25 | — |
| SP value | (A) |  | $(J/cm^3)^{0.5}$ |  | 22.1 | 22.1 |
|  | (B) |  | $(J/cm^3)^{0.5}$ |  | 19 | — |
|  | (A)-(B) |  | $(J/cm^3)^{0.5}$ |  | 3.1 | — |
| $W_B/(V_A + W_B)$ |  |  | — |  | 0.25 | 0 |
| Surface free energy of compound (A) |  |  | $mJ/m^2$ |  | 61 | 61 |
| HLB of compound (B) |  |  | — |  | 17.0 | — |
| Melting point of compound (B) |  |  | ° C. |  | 48 | — |
| n of compound (B) |  |  |  |  | 90 | — |
| Deposit of sizing agent |  |  | parts by mass/ 100 parts by mass of carbon fiber |  | 0.3 | 0.3 |

TABLE 7-continued

|  | Unit |  | Example 32 | Comparative example 19 |
|---|---|---|---|---|
| Thermoplastic resin (C) | C-1 | polyetherimide (glass transition temperature 217° C.) | ○ | ○ |
| Interfiber friction coefficient | — |  | 0.22 | 0.38 |
| Spreadability (spread fiber width) | — |  | 5.1 | 2.2 |
| Void | — |  | absent | present |

Comparative Example 19

Except for using sizing agent-coated carbon fiber bundles as prepared in Comparative example 13, the same procedure as in Example 32 was carried out to produce a molded body. Results obtained above are summarized in Table 7, showing that the above molded body had internal voids and was low in impregnatability.

EXPLANATION OF NUMERALS

1: fiber bundle
2: fixation point A
3: fixation point B
4: fixation point C
5: entangling point
6: tearable distance

INDUSTRIAL APPLICABILITY

The present invention can provide a sizing agent-coated carbon fiber bundle that shows high spreadability during the step for spreading the sizing agent-coated carbon fibers even when it exhibits high-level adhesiveness to thermoplastic resin. The thermoplastic resin composition according to the present invention and the molded body produced therefrom is high in strength though light in weight, and accordingly, it can be used suitably in many fields including aircraft members, spacecraft members, automobile members, ship members, civil engineering/construction materials, and sporting goods.

The invention claimed is:

1. A sizing agent-coated carbon fiber bundle comprising carbon fibers coated with a sizing agent containing a compound (A) having an amino group or an amide group wherein
a sizing agent-coated carbon fiber bundle comprising carbon fibers coated with a sizing agent containing a compound (A) having an amino group or an amide group and a compound (B) as represented by formulae (I) and/or (II) given below, altogether accounting for 50 parts by mass or more relative to the total quantity, which accounts for 100 parts by mass, of the sizing agent, and wherein
the sizing agent satisfies formula (III) wherein WA and WB are the masses of the compounds (A) and (B), respectively, and the difference between the SP value of the compound (A) and that of the compound (B) is 0.5 to 4.0 $(J/cm^3)^{0.5}$:

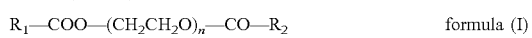
$$R_1-COO-(CH_2CH_2O)_n-CO-R_2 \quad \text{formula (I)}$$

$$R_3-COO-(CH_2CH_2O)_n-H \quad \text{formula (II)}$$

wherein $R_1$, $R_2$, and $R_3$ each represent a hydrocarbon group containing 1 or more carbon atoms, n is 9 to 100, and $$0.2 \leq WB/(WA+WB) < 0.6 \quad \text{formula (III)}.$$

2. A sizing agent-coated carbon fiber bundle as set forth in claim 1, wherein the compound (A) is aliphatic amine.

3. A sizing agent-coated carbon fiber bundle as set forth in claim 1, wherein the compound (A) is a compound having two or more functional groups in one molecule.

4. A sizing agent-coated carbon fiber bundle as set forth in claim 1, wherein the compound (A) is a polyalkylene imine.

5. A sizing agent-coated carbon fiber bundle as set forth in claim 1, wherein the compound (B) has a HLB of 10 or more.

6. A sizing agent-coated carbon fiber bundle as set forth in claim 1, wherein the compound (B) has an n of 12 or more.

7. A sizing agent-coated carbon fiber bundle as set forth in claim 1, wherein the compound (B) has a melting point of 20° C. or more.

8. A sizing agent-coated carbon fiber bundle as set forth in claim 1, wherein the compound (A) has a surface free energy of 45 $mJ/m^2$ or more.

9. A sizing agent-coated carbon fiber bundle as set forth in claim 1, wherein the sizing agent is substantially free of compounds containing epoxy groups.

10. A sizing agent-coated carbon fiber bundle as set forth in claim 1, wherein the interfiber friction coefficient is 0.30 or less.

11. A sizing agent-coated carbon fiber bundle as set forth in claim 1, wherein the deposit of the sizing agent accounts for 0.01 part by mass or more and 1.0 part by mass or less relative to 100 parts by mass of the sizing agent-coated carbon fibers.

12. A production method for a sizing agent-coated carbon fiber bundle as set forth in claim 1 comprising a step for coating the carbon fibers with the sizing agent using an aqueous solvent.

13. A production method for a sizing agent-coated carbon fiber bundle as set forth in claim 12, wherein the step for coating the carbon fibers with the sizing agent using an aqueous solvent is followed by a preliminary drying step for drying the carbon fiber bundle after being coated with a sizing agent by a contact drying method and a second drying step for drying the fiber bundle coated with a sizing agent by a contact or a noncontact heating method, the drying temperature in the second drying step being 20° C. to 250° C.

14. A thermoplastic resin composition comprising a sizing agent-coated carbon fiber bundle as set forth in claim 1 and a thermoplastic resin (C).

15. A thermoplastic resin composition as set forth in claim 14, wherein the thermoplastic resin (C) has a glass transition temperature of 200° C. or more.

16. A molded body produced from a thermoplastic resin composition as set forth in claim 14 that is designed for use as a molding material in the form of prepreg or UD tape.

17. A molded body production method comprising the preparation of a thermoplastic resin composition using a sizing agent-coated carbon fiber bundle prepared according to the sizing agent-coated carbon fiber bundle production method as set forth in claim 12 and a thermoplastic resin (C) and also comprising a step for heating the thermoplastic resin composition at 300° C. or more.

* * * * *